(12) United States Patent
Matthews, Jr. et al.

(10) Patent No.: US 9,002,547 B2
(45) Date of Patent: *Apr. 7, 2015

(54) SYSTEM AND METHOD FOR DETERMINING DYNAMICALLY CHANGING DISTRIBUTIONS OF VEHICLES IN A VEHICLE SYSTEM

(71) Applicant: General Electric Company, Schenectady, NY (US)

(72) Inventors: Harry Kirk Matthews, Jr., Niskayuna, NY (US); Dan Dai, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/319,885

(22) Filed: Jun. 30, 2014

(65) Prior Publication Data

US 2014/0316618 A1 Oct. 23, 2014

Related U.S. Application Data

(63) Continuation-in-part of application No. 13/729,298, filed on Dec. 28, 2012.

(51) Int. Cl.
*B61L 3/00* (2006.01)
*G06F 17/10* (2006.01)
(Continued)

(52) U.S. Cl.
CPC .............. *B61L 3/00* (2013.01); *B60L 15/2045* (2013.01); *B60L 15/38* (2013.01); *B61L 3/006* (2013.01);
(Continued)

(58) Field of Classification Search
CPC ........... G06F 17/00; B61L 3/006; B61L 3/16; B61L 3/02; B61L 3/00; B61L 15/0081; B60L 15/38; B60L 2200/26; B60L 15/2045; B60L 2240/645; B60L 2240/642; B60L 2240/80; B60L 2270/12; Y02T 30/10; B61C 17/12
USPC ........... 701/1, 19, 117; 180/14.1, 14.4; 703/2; 246/167 R, 186
See application file for complete search history.

(56) References Cited

U.S. PATENT DOCUMENTS 5,720,455 A 2/1998 Klemanski et al.
5,738,311 A 4/1998 Fernandez
(Continued)

FOREIGN PATENT DOCUMENTS

WO WO9960735 A1 11/1999
WO WO2010039680 A1 4/2010
ZA 200101708 A 8/2001

*Primary Examiner* — Russell Frejd
(74) *Attorney, Agent, or Firm* — The Small Patent Law Group LLC; Dean Small

(57) ABSTRACT

A system and method for determining dynamically changing distributions of vehicles in a vehicle system are disclosed. The system and method determine handling parameters of the vehicle system. The handling parameters are determined for different distributions of the vehicles among different groups at different potential change points along a route. The system and method also determine whether to change the distributions at potential change points based on the handling parameters. Based on determining that the distributions are to change, a selected sequence of changes to the distributions is determined at one or more of the potential change points along the route. Change indices are generated based on the selected sequence. The change indices designate times and/or the one or more potential change points at which the distributions changes. The vehicles included in a common group have common designated operational settings while the vehicles are in the common group.

20 Claims, 12 Drawing Sheets

(51) Int. Cl.
  B60L 15/20  (2006.01)
  B60L 15/38  (2006.01)
  B61L 15/00  (2006.01)
  G06F 17/00  (2006.01)
  *B61C 17/12*  (2006.01)
  *B61L 3/02*  (2006.01)
  *B61L 3/16*  (2006.01)

(52) U.S. Cl.
  CPC ............ B61L 15/0081 (2013.01); G06F 17/00 (2013.01); *Y02T 30/10* (2013.01); *B61C 17/12* (2013.01); *B61L 3/02* (2013.01); *B61L 3/16* (2013.01); *B60L 2240/642* (2013.01); *B60L 2240/80* (2013.01); *B60L 2270/12* (2013.01); *B60L 2240/645* (2013.01); *B60L 2200/26* (2013.01)

(56) References Cited

U.S. PATENT DOCUMENTS

| | | |
|---|---|---|
| 5,740,547 A | 4/1998 | Kull et al. |
| 5,785,392 A | 7/1998 | Hart |
| 5,813,635 A | 9/1998 | Fernandez |
| 5,820,226 A | 10/1998 | Hart |
| 5,833,325 A | 11/1998 | Hart |
| 5,927,822 A | 7/1999 | Hart |
| 5,934,764 A | 8/1999 | Dimsa et al. |
| 5,969,643 A | 10/1999 | Curtis |
| 5,978,718 A | 11/1999 | Kull |
| 5,986,577 A | 11/1999 | Bezos |
| 5,986,579 A | 11/1999 | Halvorson |
| 5,995,881 A | 11/1999 | Kull |
| 6,114,974 A | 9/2000 | Halvorson |
| 6,128,558 A | 10/2000 | Kernwein |
| 6,163,089 A | 12/2000 | Kull |
| 6,216,095 B1 | 4/2001 | Glista |
| 6,275,165 B1 | 8/2001 | Bezos |
| 6,322,025 B1 | 11/2001 | Colbert et al. |
| 6,360,998 B1 | 3/2002 | Halvorson et al. |
| 6,377,215 B1 | 4/2002 | Halvorson et al. |
| 6,782,044 B1 | 8/2004 | Wright et al. |
| 7,416,262 B2 | 8/2008 | Ring |
| 8,157,218 B2 | 4/2012 | Riley et al. |
| 8,239,078 B2 | 8/2012 | Siddappa et al. |
| 8,428,798 B2 | 4/2013 | Kull |
| 2005/0121971 A1 | 6/2005 | Ring |
| 2009/0090818 A1* | 4/2009 | Kumar .................. 246/186 |
| 2013/0131909 A1* | 5/2013 | Cooper et al. ............ 701/23 |

* cited by examiner

| Sequence | k | (k+1) | (k+2) | (k+3) | (k+4) | (k+5) | (k+6) | (k+7) |
|---|---|---|---|---|---|---|---|---|
| 1 | X | | | | X | | | |
| 2 | X | | | | | X | | |
| 3 | X | | | | | | X | X |
| 4 | X | | | | | | | |
| 5 | | X | | | | X | | |
| 6 | | X | | | | | X | X |
| 7 | | X | | | | | | X |
| 8 | | | X | | | | | |
| 9 | | | X | | | | X | X |
| 10 | | | | X | | | | |
| 11 | | | | | X | | | |
| 12 | | | | | | X | | |
| 13 | | | | | | | X | X |
| 14 | | | | | | | | X |

FIG. 11

SYSTEM AND METHOD FOR DETERMINING DYNAMICALLY CHANGING DISTRIBUTIONS OF VEHICLES IN A VEHICLE SYSTEM

CROSS-REFERENCE TO RELATED APPLICATIONS

This application is a continuation-in-part of U.S. patent application Ser. No. 13/729,298, which was filed on 28 Dec. 2012, and is titled "System And Method For Asynchronously Controlling A Vehicle System," the entire disclosure of which is incorporated by reference.

TECHNICAL FIELD

Embodiments of the subject matter disclosed herein relate to determining plans for controlling operations of vehicle systems.

BACKGROUND

Some known vehicle systems include multiple vehicles connected together so that the vehicles can travel together. Such vehicle systems can be referred to as consists. Some rail vehicle systems can include multiple consists that each includes locomotives (or other powered rail vehicles) providing propulsive force.

The operations of the locomotives can be coordinated with each other by remotely controlling some locomotives from another locomotive in the rail vehicle. For example, distributed power (DP) control of the locomotives may involve all locomotives in the rail vehicle system (e.g., a train) being controlled to have the same throttle and/or brake settings at the same time. Alternatively, the locomotives in a first consist of the rail vehicle system may operate with the same throttle or brake settings while the locomotives in a different, second consist of the same rail vehicle system operate with throttle or brake settings that are the same, but different from the settings used by the locomotives in the first consist.

Because rail vehicle systems may be very long, different segments of the rail vehicle systems may experience different grades and/or curvatures in a track at the same time. Using the same throttle or brake settings for multiple locomotives traveling over different grades and/or curvatures can result in undesirable forces on couplers of the rail cars that are located between the locomotives and/or undesirable movements of the rail cars. For example, when cresting a hill, using the same throttle settings on all locomotives can cause the rail cars located at or near the apex of the hill to experience relatively large tensile forces, can cause the rail cars on the downward slope of the hill to move faster than and away from other rail cars at or near the apex, and/or can cause the rail cars on the upward slope of the hill to move slower than and away from the other rail cars at or near the apex. These forces and/or movements can damage the couplers, cause the rail vehicle system to break apart, and/or generally degrade handling of the rail vehicle system as experienced by an operator of the rail vehicle system.

BRIEF DESCRIPTION

In one embodiment, a method (e.g., for determining operational settings for a vehicle system having multiple vehicles connected with each other by couplers to travel along a route) includes identifying total power outputs to be provided by propulsion-generating vehicles of the vehicles in the vehicle system. The total power outputs are determined for different locations of the vehicle system along the route. The method also includes calculating handling parameters of the vehicle system at one or more of the different locations along the route. The method also includes determining asynchronous operational settings for the propulsion-generating vehicles at the different locations along the route. The asynchronous operational settings represent different operational settings for the propulsion-generating vehicles that cause the propulsion-generating vehicles to provide at least the total power outputs at the respective different locations while changing the handling parameters of the vehicle system to one or more designated values at the different locations along the route. As one example, the different operational settings may be different notch settings of throttles of the different vehicles in the vehicle system. Due to differences in the vehicles, different notch settings on different vehicles may result in the vehicles individually providing the same amount of power output. Alternatively, the vehicles may provide different power outputs when using the same throttle settings. The method further includes communicating the asynchronous operational settings to the propulsion-generating vehicles in order to cause the propulsion-generating vehicles to implement the asynchronous operational settings at the different locations.

In one embodiment, a system (e.g., a control system for a vehicle system) includes an effort determination unit configured to identify total power outputs to be provided by a vehicle system that includes multiple vehicles connected with each other by couplers to travel along a route. The effort determination unit also is configured to identify the total power outputs to be provided by propulsion-generating vehicles of the vehicles in the vehicle system at different locations of the vehicle system along the route. The system includes a handling unit configured to calculate handling parameters of the vehicle system at one or more of the different locations along the route. The system includes a processing unit configured to determine asynchronous operational settings for the propulsion-generating vehicles at the different locations along the route. The asynchronous operational settings represent different operational settings for the propulsion-generating vehicles that cause the propulsion-generating vehicles to provide at least the total power outputs at the respective different locations while changing the handling parameters of the vehicle system to one or more designated values at the different locations along the route. The asynchronous operational settings are configured to be communicated to the propulsion-generating vehicles in order to cause the propulsion-generating vehicles to implement the asynchronous operational settings at the different locations.

In one embodiment, a method (e.g., for determining operational settings for a vehicle system having two or more propulsion-generating vehicles coupled with each other by one or more non-propulsion generating vehicles) includes obtaining route data and vehicle data. The route data is representative of one or more grades of a route at one or more locations along the route that is to be traveled by the vehicle system. The vehicle data is representative of a size of the one or more non-propulsion generating vehicles disposed between the propulsion-generating vehicles. The method also includes calculating one or more estimated natural forces that are to be exerted on couplers connected with the one or more non-propulsion generating vehicles of the vehicle system at the one or more locations along the route. The one or more estimated natural forces are based on the size of the one or more non-propulsion generating vehicles and the one or more grades of the route at the one or more locations along the route. The method also includes determining asynchronous operational settings to be implemented by the two or more propulsion-generating vehicles at the one or more locations along the route. Implementing the asynchronous operational settings by the two or more propulsion-generating vehicles reduces one or more actual natural forces that are actually exerted on the couplers to forces that are smaller than the one or more estimated natural forces when the vehicle system travels over the one or more locations along the route.

In another embodiment, a method (e.g., for determining dynamically changing distributions of vehicles in a vehicle system) includes determining handling parameters of a vehicle system that includes plural vehicles operably coupled with each other to travel along a route during a trip. The handling parameters are determined for different distributions of the vehicles among different groups of the vehicles at different potential change points along the route. The method also includes determining whether to change the distributions of the vehicles among the different groups at one or more of the potential change points based on the handling parameters that are determined and, based on determining that the distributions of the vehicles among the different groups are to change, determining a selected sequence of changes to the distributions of the vehicles among the different groups at one or more of the potential change points along the route. The method also includes generating change indices for one or more of the trip or an upcoming segment of the trip based on the selected sequence. The change indices designate one or more of times or the one or more potential change points along the route at which the distributions of the vehicles among the different groups changes. The vehicles included in a common group of the different groups have common designated operational settings while the vehicles are in the common group.

In another embodiment, a system (e.g., a planning system) includes one or more processors configured to determine handling parameters of a vehicle system that includes plural vehicles operably coupled with each other to travel along a route during a trip. The handling parameters are determined for different distributions of the vehicles among different groups of the vehicles at different potential change points along the route. The one or more processors also are configured to determine whether to change the distributions of the vehicles among the different groups at one or more of the potential change points based on the handling parameters that are determined and, based on determining that the distributions of the vehicles among the different groups are to change, the one or more processors are configured to determine a selected sequence of changes to the distributions of the vehicles among the different groups at one or more of the potential change points along the route. The one or more processors also are configured to generate change indices for one or more of the trip or an upcoming segment of the trip based on the selected sequence, the change indices designating one or more of times or the one or more potential change points along the route at which the distributions of the vehicles among the different groups changes. The vehicles that are included in a common group of the different groups have common designated operational settings while the vehicles are in the common group.

In another embodiment, a method (e.g., for determining asynchronous operational settings of vehicles in a vehicle system) includes obtaining route data and vehicle data. The route data is representative of one or more of grades of a route, curvatures of the route, speed limits of the route at one or more potential change points of the route that is to be traveled by a vehicle system or that is currently being traveled by the vehicle system. The vehicle system includes plural vehicles coupled with each other. The vehicle data is representative of one or more of tractive efforts of the vehicles, braking efforts of the vehicles, or sizes of the vehicles. The method also includes predicting handling parameters of the vehicle system at the one or more potential change points of the route based on the route data and the vehicle data, and determining asynchronous operational settings to be implemented by the vehicles at the one or more potential change points of the route based on the handling parameters. The asynchronous operational settings are determined by identifying a combination of the asynchronous operational settings at the one or more potential change points of the route that result in the handling parameters being decreased below one or more designated thresholds.

BRIEF DESCRIPTION OF THE DRAWINGS

Reference is made to the accompanying drawings in which particular embodiments and further benefits of the invention are illustrated as described in more detail in the description below, in which:

FIG. 11 illustrates a table demonstrating possible sequences of changing the vehicle groupings in the vehicle system according to one embodiment;

DETAILED DESCRIPTION

Figure 1:
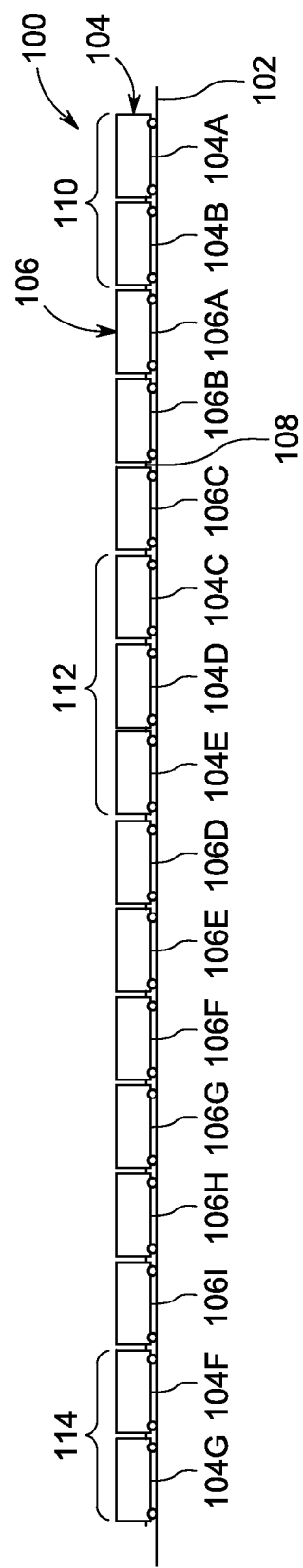
FIG. 1 illustrates a schematic diagram of one example of a vehicle system traveling along a route.

FIG. 1 illustrates a schematic diagram of one example of a vehicle system 100 traveling along a route 102. The vehicle system 100 includes several vehicles 104, 106 operably coupled with each other. The vehicles may be mechanically coupled with each other, such as by couplers 108. Alternatively, the vehicles may be coupled with each other without being mechanically coupled with each other. For example, the vehicles may be aerodynamically or fluidly coupled with each other when the vehicles travel sufficiently close to each other that the drag forces imparted on one or more of the vehicles (e.g., from air, wind, water, or the like), is reduced on one or more other vehicles. Marine vessels may be fluidly or aerodynamically coupled when the vessels travel close enough together such that the drag on one or more vessels from the water is reduced relative to the marine vessels traveling farther apart. Automobiles (e.g., trucks) may be fluidly or aerodynamically coupled when the automobiles travel close enough together such that the drag on one or more automobiles is reduced relative to the automobiles traveling farther apart. Two vehicles 104 and/or 106 may be directly connected with each other when no other vehicle 104 or 106 is disposed between the directly connected vehicles 104 and/or 106. Two vehicles 104 and/or 106 may be indirectly connected or interconnected with each other when one or more other vehicles 104 and/or 106 are disposed between and connected with the interconnected vehicles 104 and/or 106.

The vehicles 104 (e.g., vehicles 104A-G) represent propulsion-generating vehicles, such as vehicles capable of generating propulsive force to propel the vehicle system 100 along the route 102. Examples of propulsion-generating vehicles 106 include locomotives, other off-highway vehicles (e.g., vehicles that are not designed for or permitted to travel on public roadways), automobiles (e.g., vehicles that are designed for traveling on public roadways), marine vessels, and the like. In one embodiment, the vehicles 104 represent locomotives and the vehicles 106 represent rail cars. The vehicles 104 may be fuel-powered vehicles (e.g., engines that consume fuel are used to generate propulsive force by creating electric current to power motors or to rotate axles and wheels), electric-powered vehicles (e.g., onboard or offboard sources of electric current are used to power motors to generate propulsive force), and/or hybrid powered vehicles (e.g., vehicles that are powered by fuel-consuming engines and other sources of electric current). The vehicles 106 (e.g., vehicles 106A-I) represent non-propulsion-generating vehicles, such as rail cars or other units that are propelled along the route 102 by the propulsion-generating vehicles 104.

The term "vehicle" as used herein can be defined as a mobile machine that transports at least one of a person, people, or a cargo. For instance, a vehicle can be, but is not limited to being, a rail car, an intermodal container, a locomotive, a marine vessel, mining equipment, construction equipment, an automobile, and the like. A "vehicle system" includes two or more vehicles that are interconnected with each other to travel along a route. For example, a vehicle system can include two or more vehicles that are directly connected to each other (e.g., by a coupler) or that are indirectly connected with each other (e.g., by one or more other vehicles and couplers). A vehicle system can be referred to as a consist, such as a rail vehicle consist.

"Software" or "computer program" as used herein includes, but is not limited to, one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, an application, instructions stored in a memory, part of an operating system or other type of executable instructions. "Computer" or "processing element" or "computer device" as used herein includes, but is not limited to, any programmed or programmable electronic device that can store, retrieve, and process data. "Non-transitory computer-readable media" include, but are not limited to, a CD-ROM, a removable flash memory card, a hard disk drive, a magnetic tape, and a floppy disk. "Computer memory", as used herein, refers to a storage device configured to store digital data or information which can be retrieved by a computer or processing element. "Controller," "unit," and/or "module," as used herein, can to the logic circuitry and/or processing elements and associated software or program involved in controlling an energy storage system. The terms "signal", "data", and "information" may be used interchangeably herein and may refer to digital or analog forms.

At least one technical effect described herein includes generating command profiles and change indices for a trip of a vehicle system. The command profiles can dictate operational settings (e.g., throttle notch settings or other settings) of propulsion-generating vehicles in the vehicle system, and the change indices can dictate where and/or when distributions of the vehicles among different groups and/or fence positions in the vehicle system are to be changed. The command profiles and/or change indices may be generated before the vehicle system embarks on the trip, generated while the vehicle system is moving along a route during the trip, subsequent to completing the trip (e.g., to allow for comparison with how the operator controlled the vehicle system during the previous trip), or a combination thereof. The command profiles and/or change indices may be used to control which propulsion-generating vehicles in the vehicle system have the same or different operational settings (e.g., throttle notch settings) at different locations in the trip in order to control bunching of the vehicle system.

The propulsion-generating vehicles 104 may be arranged in consists 110, 112, 114, as shown in FIG. 1. Each consist 110, 112, 114 may include the propulsion-generating vehicles 104 directly connected with each other in the vehicle system 100. While each consist 110, 112, 114 is shown as including multiple propulsion-generating vehicles 104, one or more of the consists 110, 112, 114 may optionally include a single propulsion-generating vehicle 104.

While the vehicle system 100 is shown in FIG. 1 as a train, alternatively, the vehicle system 100 may represent another vehicle system formed of vehicles other than locomotives (e.g., the propulsion-generating vehicles 104) and railcars (e.g., the non-propulsion generating vehicles 106). For example, the vehicle system 100 may represent several automobiles, marine vessels, off-highway vehicles other than rail vehicles, or the like, joined together to travel along the route 102.

In one embodiment, tractive efforts (e.g., power output, horsepower, speed, and the like) and/or braking efforts of the vehicle system 100 may be controlled to drive the vehicle system 100 along the route 102 from an origin location to a destination location. The tractive and/or braking efforts may be automatically controlled such that the tractive and/or braking efforts provided by the vehicles 104, 106 without operator intervention involved in changing these efforts. Alternatively or additionally, the vehicle system 100 may provide prompts and notices to an operator that direct the operator how to manually control the efforts of the vehicle system 100. For example, the system 100 may provide prompts to an operator to instruct the operator of which operational settings to use at a current time and/or which settings to use at upcoming times when the system 100 arrives at one or more upcoming locations.

The tractive efforts and braking efforts may be controlled by designating operational settings of the vehicle system 100 at one or more locations along the route 102. By way of example, these operational settings can include power settings (e.g., throttle notch settings) that control the power output from the propulsion-generating vehicles 104 and brake settings (e.g., dynamic brake settings) that control the braking efforts of the propulsion-generating vehicles 104 and/or the non-propulsion generating vehicles 106. The operational settings that are designated for a trip of the vehicle system 100 from a first location to a different, second location along the route 102 may be referred to as a trip plan. The designated operational settings can be expressed as a function of time elapsed during a trip along the route 102 and/or distance along the route 102 in the trip plan.

The designated operational settings can be computed in order to improve handling (e.g., control) of the vehicle system 100. For example, the designated operational settings can be determined in order to reduce the frequency at which throttle notch settings and/or brake settings are changed, to reduce abrupt jerking movements of the vehicle system 100 or segments of the vehicle system 100, to reduce forces exerted on the couplers 108, and the like.

In one embodiment, different propulsion-generating vehicles 104 may have different operational settings at the same location and/or time along the route 102. For example, the propulsion-generating vehicles 104 may be asynchronously controlled so that not all of the vehicles 104 in the vehicle system 100 and/or in a single consist 110, 112, 114 are controlled according to the same throttle and/or brake settings. Alternatively, the propulsion-generating vehicles 104 may be divided into groups (e.g., the consists 110, 112, 114 or other groupings) with virtual "fences" between the groups. A fence demarcates a pair of groups of the propulsion-generating vehicles 104 on opposite sides of the fence. For example, if a fence is established between the consists 112 and 114, then the propulsion-generating vehicles 104C-E in the consist 112 may operate using a first designated throttle notch setting while the propulsion-generating vehicles 104F-G in the consist 114 may operate using a different, second designated throttle notch setting at the same time. Operation of the vehicle system 100 that involves two or more of the propulsion-generating vehicles 104 using different operational settings at the same time may be referred to as asynchronous distributed power operation in one embodiment.

Figure 2:
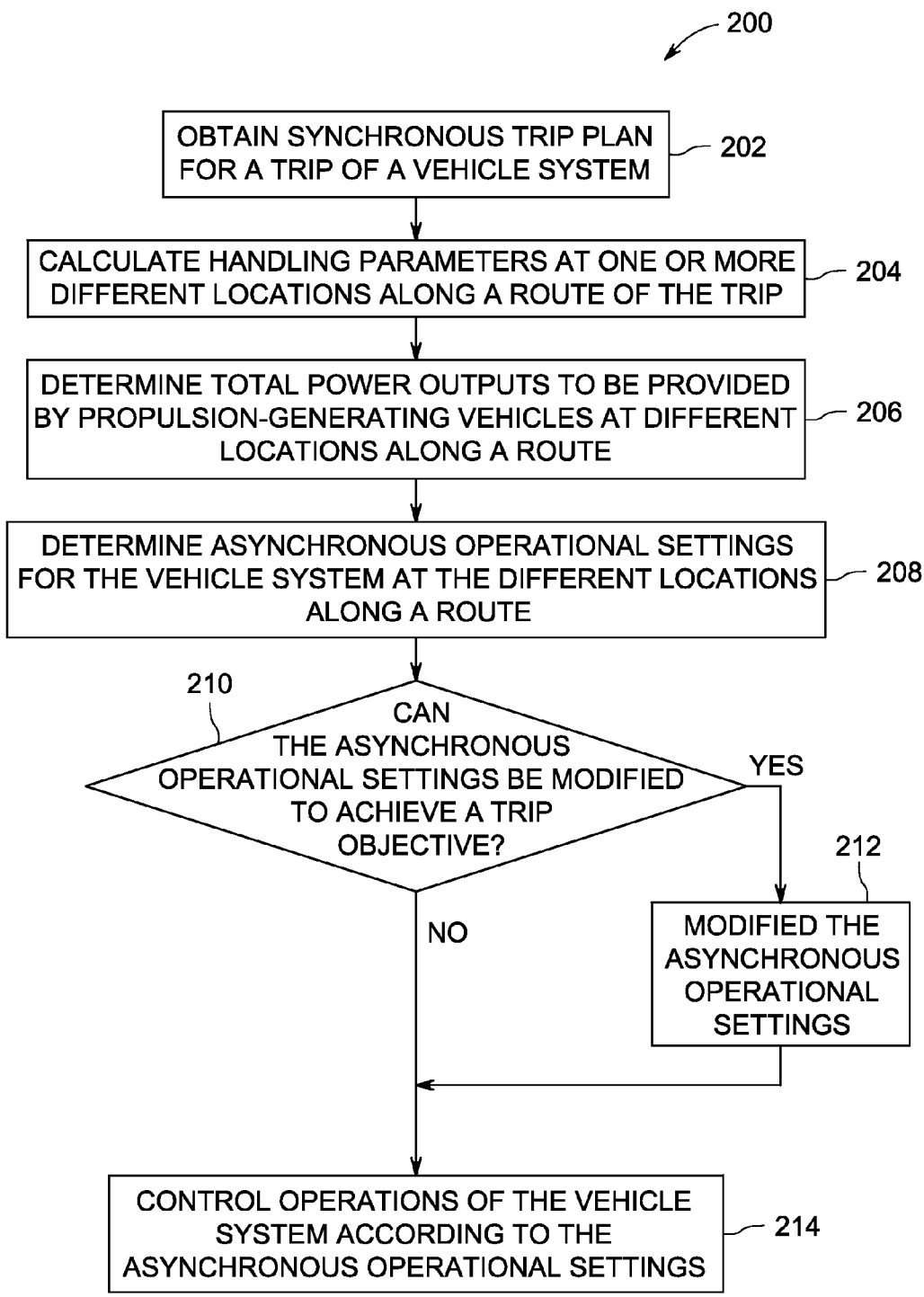
FIG. 2 is a flowchart of one embodiment of a method for operating the vehicle system shown in FIG. 1.
Figure 3:
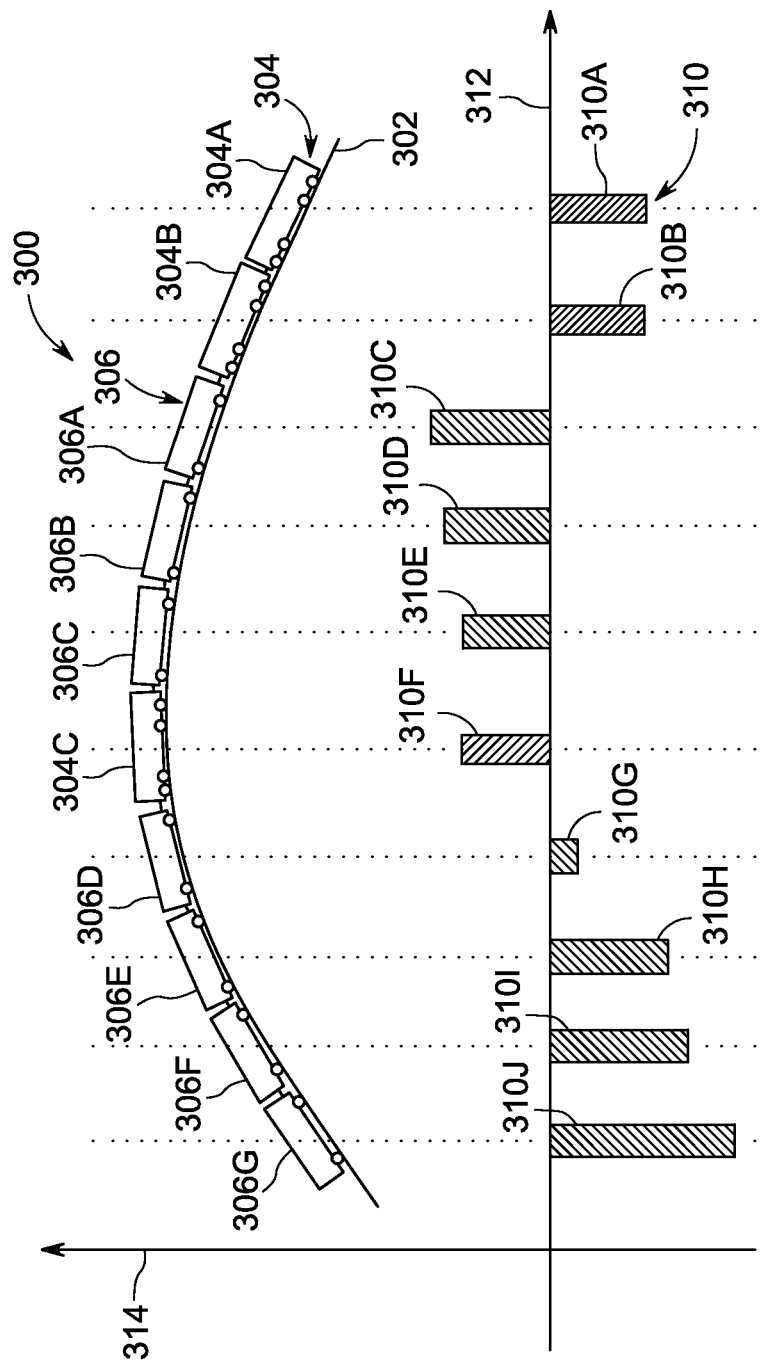
FIG. 3 illustrates coupler parameters that are estimated for a vehicle system to travel along a route in accordance with one example.
Figure 4:
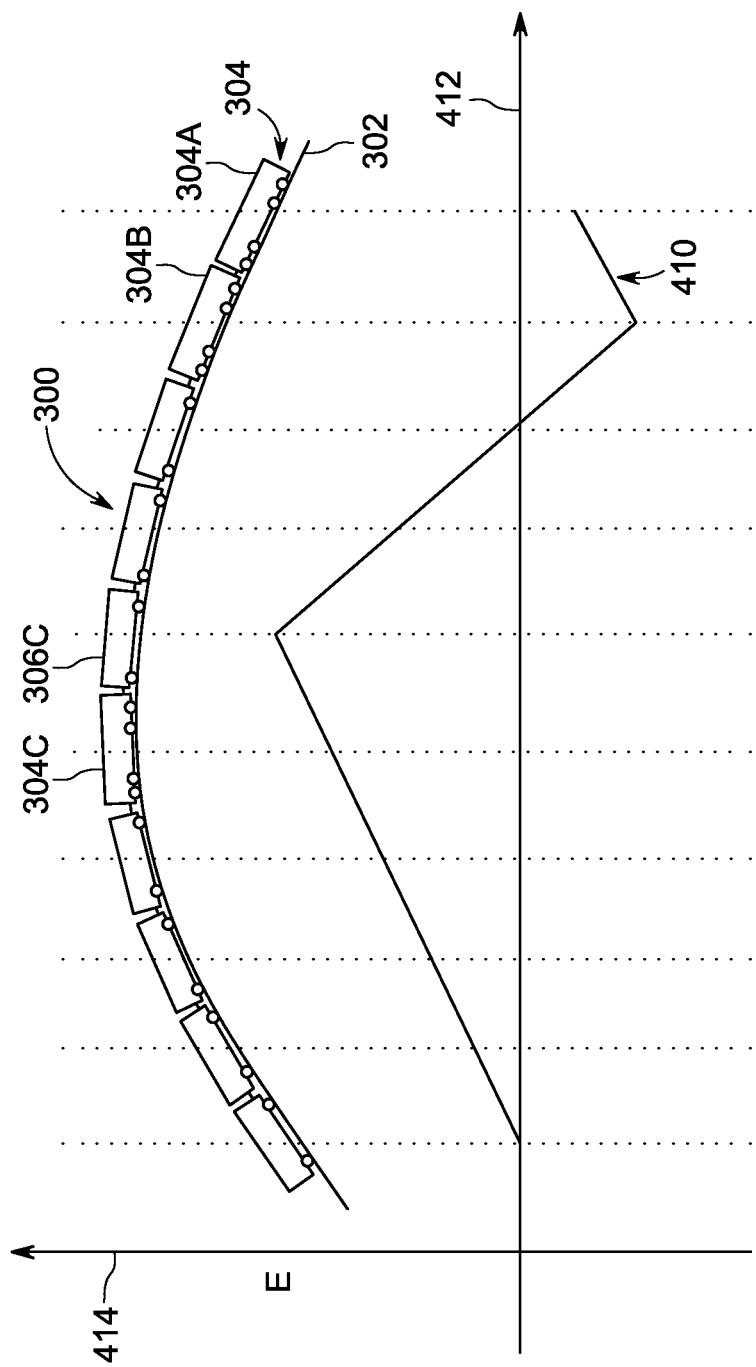
FIG. 4 illustrates terrain excitation parameters that are estimated for the vehicle system shown in FIG. 3 to travel along the route also shown in FIG. 3 in accordance with one example.

FIGS. 2 through 4 illustrate embodiments of how operations of the propulsion-generating vehicles 104 in the vehicle system 100 can be controlled in order to improve handling of the vehicle system 100 during a trip while achieving one or more trip objectives and while remaining within operating constraints on the trip. The trip objectives may be a reduction in fuel consumption, emission generation, and/or travel time relative to traveling with the same vehicle system 100 along the same route 102, but using different operational settings at one or more locations along the route 102. The operating constraints may include speed limits (both lower limits on speed and upper limits on speed), power requirements (e.g., minimum requirements for power to propel the vehicle system 100 up an incline), time limitations on how long an operator may be working on the vehicle system 100, a system-wide schedule for the travel of multiple vehicle systems on or across the route 102, or the like.

FIG. 2 is a flowchart of one embodiment of a method 200 for operating the vehicle system 100 shown in FIG. 1. The method 200 may be used in conjunction with the vehicle system 100. For example, the method 200 may be used to create a trip plan for the vehicle system 100 that designates operational settings to be used to asynchronously control the operations of the propulsion-generating vehicles 104 (shown in FIG. 1) during a trip along the route 102 (shown in FIG. 1) in order to improve handling of the vehicle system 100. Additionally or alternatively, the method 200 may be used to autonomously control the operations of the propulsion-generating vehicles 104 in an asynchronous manner during a trip along the route 102 in order to improve handling of the vehicle system 100. Additionally or alternatively, the method 200 may be used to direct an operator to manually control the operations of the propulsion-generating vehicles 104 in an asynchronous manner during a trip along the route 102 in order to improve handling of the vehicle system 100.

At 202, a synchronous trip plan for the trip is obtained. The trip plan may be synchronous in that the operational settings of the propulsion-generating vehicles 104 that are designated by the trip plan may be the same for the propulsion-generating vehicles 104 at the same locations. The trip plan may designate the operational settings of the vehicle system 100 in order to reduce fuel consumed, emissions generated, and the like, by the vehicle system 100 relative to the vehicle system 100 traveling along the route 102 in the trip using one or more different operational settings (e.g., according to manual control and/or another, different trip plan). One or more examples of trip plans (also referred to as mission plans or trip profiles) and how the trip plans are determined are provided in U.S. patent application Ser. No. 11/385,354 (referred to herein as the "'354 Application"), the entire disclosure of which is incorporated by reference.

In one embodiment, the synchronous trip plan can be created at 202 by collecting and using trip data, route data, and vehicle data. The trip data includes information representative of one or more constraints of the trip, such as a starting location, an ending location, one or more intermediate locations between the starting and ending locations, a scheduled time of arrival at one or more locations, weather conditions (e.g., direction and speed of wind) and the like. The route data includes information representative of the route 102, including grades, curvatures, speed limits, and the like. The vehicle data includes information representative of capabilities and/or limitations of the vehicle system 100, such as power outputs that can be provided by the vehicle system 100, tractive efforts provided by the propulsion-generating vehicles 104 at different throttle notch settings, braking efforts provided by the vehicles 104, 106 at different brake notch settings, and the like. The vehicle data also can include the size (e.g., mass, length, number of axles, weight distribution, or the like) of the vehicles 104 and/or 106 in the vehicle system 100. The trip plan can be computed from the beginning to the end of the trip and can designate speeds of the vehicle system 100, synchronous notch settings of the propulsion-generating vehicles 104, and synchronous brake settings of the propulsion-generating vehicles 104, 106 at locations along the route 102.

At 204, handling parameters are calculated at one or more different locations along the route 102. The handling parameters may be calculated prior to the vehicle system 100 embarking on the trip and/or during travel of the vehicle system 100 in the trip and prior to arriving at the one or more different locations. The handling parameters are estimates or measurements of one or more aspects of the vehicle system 100 and/or the route 102. Several examples of handling parameters are described below. The handling parameters can be representative of forces exerted on the couplers, energies stored in the couplers, relative velocities of neighboring vehicles of the vehicles in the vehicle system, natural forces exerted on one or more segments of the vehicle system between two or more of the propulsion-generating vehicles, distances between neighboring vehicles in the vehicle system, momentum of one or more vehicles and/or one or more groups of the vehicles, virtual forces exerted on one or more of the vehicles, or the like. The momentum may include changes in momentum, momentum transport, or the like. One example of handling parameters is coupler parameters. Coupler parameters include one or combinations of estimates, calculations, measurements, and/or simulations of coupler forces and/or energies stored in the couplers 108 (shown in FIG. 1) of the vehicle system 100 at one or more locations along the route 102 for the trip. In one embodiment, the coupler forces and/or energies stored in the couplers 108 can be estimated from a model of the couplers 108. For example, the couplers 108 between the vehicles 104, 106 can be modeled as springs having spring constants k and a damper (e.g., the mass of the vehicles 104 and/or 106 to which the modeled spring is coupled). Due to the tractive efforts (e.g., power outputs) provided by the propulsion-generating vehicles 104, the states of the vehicle system 100 may undergo a transition and the forces exerted on the couplers 108 and/or the energies stored in the couplers 108 that result from this transition at different locations along the route 102 can be calculated (e.g., estimated or simulated) as a function of the tractive efforts provided by the propulsion-generating vehicles 104 at the different locations. By way of example only, a first coupler 108 may be expected to become compressed due to the expected deceleration of a first leading propulsion-generating vehicle 104 and the expected acceleration of a first trailing propulsion-generating vehicle 104 that are caused by changes in the grade of the route 102 during travel according to the synchronous trip plan (e.g., when traversing a valley or low point in the route 102). Another, second coupler 108 may be expected to become stretched due to the expected acceleration of a second leading propulsion-generating vehicle 104 and the expected deceleration of a second trailing propulsion-generating vehicle 104 that are caused by changes in the grade of the route 102 during travel according to the synchronous trip plan (e.g., when traversing a peak or high point in the route 102). The first coupler 108 may be estimated to have a greater compressive force than the second coupler 108 in this example.

One or more relationships between the coupler forces and/or energies stored in the couplers 108 can be used to determine the coupler parameters. One example of a coupler parameter includes:

$$P_c = \sum_{j=1}^{nc} f_j^2 \quad \text{(Equation \#1)}$$

where $P_c$ represents a coupler parameter, nc represents a number of the couplers 108 in the vehicle system 100 (e.g., the total number of couplers 108), and $f$ represents the estimated or modeled coupler force. The coupler parameter ($P_c$) of Equation #1 may represent the sum of squares of all coupler forces between the first coupler 108 (e.g., when j=1) and the $n^{th}$ coupler 108 in the vehicle system 100.

Another example of a coupler parameter includes the maximum coupler force of the couplers 108 at a location along the route 102.

Another example of a coupler parameter includes:

$$E = \sum_{j=1}^{nc} 0.5 \frac{f_j^2}{k_j} \quad \text{(Equation \#2)}$$

where E represents another coupler parameter and k represents the spring constant of a modeled spring representative of the $j^{th}$ coupler 108. The coupler parameter (E) of Equation #2 may represent the total energy stored in the couplers 108 of j=1 through j=nc in the vehicle system 100 at a location along the route 102. Additionally or alternatively, the coupler parameter may include or represent an average of an absolute value of the coupler forces in the vehicle system 100. Additionally or alternatively, the coupler parameter may include or represent a sum, maximum, average, median, and the like of the absolute values of the coupler forces in the vehicle system 100 that are at least as large as a designated upper limit. The upper limit may be based on the location of the vehicle system 100 (e.g., the limit is based on the terrain being traveled over), vehicle data (e.g., the type of vehicles in the system 100), coupler data (e.g., the type, health, age, and the like, of the couplers in the system 100), and the like.

One or more of the coupler parameters described above and/or another coupler parameter that represents coupler force and/or energy stored in the couplers 108 may be determined for the vehicle system 100 at one or more locations along the route 102 during the trip. For example, prior to arriving at the locations, the coupler parameters may be calculated or estimated for those locations using the trip data, the vehicle data, and/or the route data.

FIG. 3 illustrates coupler parameters 310 (e.g., coupler parameters 310A-J) that are estimated for a vehicle system 300 to travel along a route 302 in accordance with one example. The vehicle system 300 may represent the vehicle system 100 (shown in FIG. 1) or a segment of the vehicle system 100. The vehicle system 300 includes propulsion-generating vehicles 304 (e.g., vehicles 304A-C), which can represent the propulsion-generating vehicles 104 (shown in FIG. 1) and non-propulsion generating vehicles 306 (e.g., vehicles 306A-G), which can represent the non-propulsion generating vehicles 106 (shown in FIG. 1). The vehicles 304, 306 are connected by couplers 108 (shown in FIG. 1). The route 302 may represent a portion of the route 102 (shown in FIG. 1).

The coupler parameters 310 are shown alongside a horizontal axis 312 that is representative of locations along the length of the vehicle system 300 and a vertical axis 314 that is representative of magnitudes of the coupler parameters 310. The size of the coupler parameters 310 indicates the relative sizes of the coupler forces and/or stored energies represented by the parameters 310. The coupler parameters 310 represent the coupler forces and/or energies of the couplers 108 joined to the respective vehicle 304, 306. For example, the coupler parameter 310A represents the coupler forces and/or stored energies of the coupler 108 connected to the vehicle 304A (or twice the coupler force and/or stored energy of the single coupler 108 connected to the vehicle 304A), the coupler parameter 310B represents the coupler forces and/or stored energies of the couplers 108 connected to the opposite ends of the vehicle 304B, the coupler parameter 310C represents the coupler forces and/or stored energies of the couplers 108 connected to the opposite ends of the vehicle 306A, and so on. Negative coupler parameters 310 (e.g., the parameters 310A-B and 310G-J extending below the horizontal axis 312) can represent couplers 108 undergoing compressive forces and positive coupler parameters 310 (e.g., the parameters 310C-F extending above the horizontal axis 312) can represent couplers 108 undergoing tensile forces.

The coupler parameters 310 can be estimated for travel over the route 302 prior to the vehicle system 300 actually traveling over the route 302 and using the synchronous trip plan established for travel over the route 302. The coupler parameters 310 may be calculated using one or more of the relationships described above, or in another manner that represents compression and/or tension in the couplers 108. In one embodiment, relatively large variances in the coupler parameters 310 can indicate poor handling of the vehicle system 300. For example, a trip plan that causes a vehicle system 300 to have relatively large, positive coupler parameters 310 and large, negative coupler parameters 310 may indicate that traveling according to the trip plan will result in poor handling of the vehicle system 300 relative to a trip plan that results in smaller positive coupler parameters 310 and/or smaller negative coupler parameters 310.

Returning to the discussion of the method 200 shown in FIG. 2, another example of handling parameters is terrain excitation parameters. Terrain excitation parameters represent grades of the route 102 (shown in FIG. 1) at the different locations, masses of one or more of the vehicles 104, 106 (shown in FIG. 1) in the vehicle system 100 (shown in FIG. 1) at the different locations, and/or tractive efforts that are to be provided by one or more of the propulsion-generating vehicles 104 at the different locations according to a trip plan (e.g., a synchronous trip plan).

A terrain index can represent the terrain under each vehicle 104, 106 as the vehicle system 100 travels along the route 102. The terrain index may have a static component (e.g., a DC or average or steady component) and a dynamic component (e.g., an AC or varying or oscillating component). The static component of the terrain index can be defined as:

$$=\mu_i = -m_i g_i + T_i \qquad \text{(Equation \#3)}$$

where $u_i$ represents the static component of the terrain index beneath the $i^{th}$ vehicle 104, 106 in the vehicle system 100, $m_i$ represents the mass of the $i^{th}$ vehicle 104, 106, $g_i$ represents the grade of the route 102 beneath the $i^{th}$ vehicle 104, 106, and $T_i$ represents a designated tractive effort and/or braking effort to be provided by the $i^{th}$ vehicle 104, 106 according to the trip plan (e.g., the synchronous trip plan).

The dynamic component of the terrain index can be defined as:

$$\tilde{\mu}_i = -m_i g_i + T_i - \sum_{j=1}^{N} \mu_j \qquad \text{(Equation \#4)}$$

where $\tilde{\mu}_i$ represents the dynamic component of the terrain index and N represents the number of vehicles 104, 106 for which the terrain index is determined. In one embodiment, the coupler parameters 310 shown in FIG. 3 can represent the dynamic component of the terrain index for the vehicle system 300 instead of the coupler parameters of the vehicle system 300.

In one embodiment, the terrain excitation parameter may be based on the dynamic component of the terrain index. For example, the terrain excitation parameter may be a filtered dynamic component of the terrain index and represented by:

$$e(k) = \sum_{i=1}^{k} \tilde{\mu}_i a^{k-1} \qquad \text{(Equation \#5)}$$

$$e(i) = \tilde{\mu}_i a^{k-1} \qquad \text{(Equation \#6)}$$

where $e(k)$ represents the terrain excitation parameter for the vehicle system 100 beneath the $k^{th}$ vehicle 104, 106, a represents a configurable or tunable constant referred to as a spatial decay rate of terrain input and having a value between 0 and 1, $e(i)$ represents the terrain excitation parameter for the $i^{th}$ vehicle 104, 106 in the vehicle system 100, and m represents the number of vehicles 104, 106 in the vehicle system 100.

FIG. 4 illustrates terrain excitation parameters 410 that are estimated for the vehicle system 300 to travel along the route 302 in accordance with one example. The terrain excitation parameters 410 are shown alongside a horizontal axis 412 representative of locations along the length of the vehicle system 300 and a vertical axis 414 representative of magnitudes of the terrain excitation parameters 310.

As shown in FIG. 4, when the trip plan directs the propulsion-generating vehicles 304A-C to use the same braking efforts during traversal of the peak or apex in the route 302, the terrain excitation parameters 410 increase along the length of the vehicle system 300 and then decrease. For example, the terrain excitation parameters 410 corresponding to locations below the back end of the vehicle system 300 to beneath the non-propulsion generating vehicle 306C increase to a maximum, and then decrease to a minimum beneath the propulsion-generating vehicle 306B, before increasing again beneath the propulsion-generating vehicle 306A.

The terrain excitation parameters 410 can be estimated for travel over the route 302 prior to the vehicle system 300 actually traveling over the route 302 and using the synchronous trip plan established for travel over the route 302. The terrain excitation parameters 410 may be calculated using one or more of the relationships described above, or in another manner that represents compression and/or tension in the couplers 108. In one embodiment, relatively large terrain excitation parameters 410 (e.g., large positive and/or large negative values) can indicate poor handling of the vehicle system 300. For example, a trip plan that causes a vehicle system 300 to have relatively large maximum or minimum terrain excitation parameters 410 may indicate that traveling according to the trip plan will result in poor handling of the vehicle system 300 relative to a trip plan that results in smaller maximum or minimum terrain excitation parameters 410.

Returning to the discussion of the method 200 shown in FIG. 2, another example of handling parameters is node parameters. Node parameters represent a number of the nodes in the vehicle system 100 (shown in FIG. 1) and/or a rate of movement of the nodes in the vehicle system 100. A node can represent a location in the vehicle system 100 where an absolute value of force that is estimated to be exerted on a coupler 108 is less than a designated threshold. In order to identify the presence and locations of nodes, a rigid rope model of the vehicle system 100 may be used. In such a model, the couplers 108 are treated as having no slack and the vehicle system 100 is treated as traveling according to the trip plan (e.g., the synchronous trip plan). Locations where the couplers 108 are estimated to have relatively large compressive forces or relatively large tensile forces due to the tractive and/or braking efforts designated by the trip plan and due to the grades in the route 102 (shown in FIG. 1) are not identified as nodes. Other locations where the couplers 108 are estimated to have relatively small or no compressive or tensile forces are identified as nodes.

With respect to the example shown in FIG. 3, the coupler parameter 310G may represent the location of a node in the vehicle system 300. The number of nodes (e.g., one in the example of FIG. 3, but alternatively may be a larger number) can be a node parameter. Additionally or alternatively, the rate of movement of the nodes in the vehicle system can be a node parameter. For example, as the vehicle system moves up and down different grades of the route and/or using tractive and/or braking efforts designated by the synchronous trip plan, the locations of the nodes within the vehicle system may change (e.g., move to another coupler 108). This movement can be estimated as a speed or rate of movement, such as in units of number of couplers per second, number of vehicles per second, and the like.

Returning to the discussion of the method 200 shown in FIG. 2, another example of handling parameters is neighboring velocity parameters. The neighboring velocity parameters can represent differences in speed between neighboring vehicles 104 and/or 106 in the vehicle system 100 shown in FIG. 1. For example, speeds of the vehicles 104, 106 traveling according to a synchronous trip plan can be estimated based on the sizes (e.g., masses) of the vehicles 104, 106, the location of the vehicles 104, 106 in the vehicle system 100, the grade of the route 102, and the like. Because the couplers 108 between the vehicles 104, 106 are not entirely rigid bodies, there may be some differences in the speeds of the vehicles 104, 106 that are directly connected with each other.

For example, a leading propulsion-generating vehicle 104 that is accelerating according to a trip plan may at least temporarily travel faster than another, heavier propulsion-generating vehicle 104 that is directly coupled to the leading propulsion-generating vehicle 104 and/or than a non-propulsion generating vehicle 106 that is directly coupled to the leading propulsion-generating vehicle 104. As another example, when cresting a hill, a first vehicle 104 or 106 that is on the downward sloping side of the hill may be temporarily traveling faster than a second vehicle 104 or 106 that is directly connected to the first vehicle 104 or 106 and that is on the upward sloping side of the hill. In another example, when traversing a dip or low point in the route 102, a first vehicle 104 or 106 that is on the upward sloping side of the low point may be temporarily traveling slower than a second vehicle 104 or 106 that is directly connected to the first vehicle 104 or 106 and that is on the downward sloping side of the low point. The differences in speeds between the neighboring (e.g., adjacent) vehicles 104 and/or 106 can vary forces exerted on the couplers 108 to generate jerking movements that decrease the handling of the vehicle system 100.

At 206, total power outputs that are to be provided by the vehicle system 100 are determined at the locations along the route 102. For example, the total power outputs that are to be provided, in the aggregate, by the propulsion-generating vehicles 104 in the vehicle system 100 may be determined for at least some, or all, the same locations at which the handling parameters are determined at 204.

In one embodiment, the total power outputs can be determined from the synchronous trip plan. For example, the synchronous trip plan may designate the total power outputs to be provided by the propulsion-generating vehicles 104 at the locations. Alternatively, the synchronous trip plan can designate the individual power outputs to be provided by each of the propulsion-generating vehicles 104 at the locations, and the total power outputs of the vehicle system 100 can be determined from the sum or other aggregate of these individual power outputs. In another embodiment, the total power outputs can be derived from other designated operational settings of the synchronous trip plan at the locations. For example, the total power outputs may be calculated from the designated speeds, accelerations, or other settings of the synchronous trip plan at the locations. The total power outputs may be determined before, during, or after the handling parameters are determined.

At 208, asynchronous operational settings for the vehicle system 100 are determined. For example, the total power outputs can be distributed among the propulsion-generating vehicles 104 in the vehicle system 100 at the locations and based on the handling parameters by determining different operational settings for different vehicles 104, 106 at these locations. The total power outputs of the synchronous trip plan may be distributed among the propulsion-generating vehicles 104 by designating the same throttle and/or brake settings for each of the propulsion-generating vehicles 104. Using the handling parameters that are determined at the locations along the route 102, the same total power outputs at these locations can be distributed among the propulsion-generating vehicles 104 by designating different throttle and/or brake settings for the propulsion-generating vehicles 104. For example, the synchronous trip plan may direct the seven propulsion-generating vehicles 104 to use the same throttle setting to generate a total power output of 15,000 horsepower at a location along the route 102. This 15,000 horsepower may be asynchronously distributed among the propulsion-generating vehicles 104 by assigning different throttle and/or brake settings to the different propulsion-generating vehicles 104. The propulsion-generating vehicles 104 may use the different operational settings in order to provide at least the 15,000 horsepower, but with improved handling of the vehicle system 100 relative to the synchronous trip plan.

In one embodiment, the asynchronous operational settings are determined based on the handling parameters for all of the locations along the route 102 for which the handling parameters were estimated. Alternatively, the asynchronous operational settings may be determined for a subset of these locations, such as for the locations associated with handling parameters that exceed one or more designated thresholds. The handling parameters that exceed the thresholds may indicate locations or segments of the route 102 where handling of the vehicle system 100 may be more difficult than other locations or segments of the route 102.

The different operational settings of the propulsion-generating vehicles 104 may be designated for use by the vehicles 104 prior to embarking on the trip. For example, before the vehicle system 100 begins the trip (e.g., leaves a location of trip origin), the method 200 may be used to convert the same operational settings designated by the synchronous trip plan into the different (e.g., asynchronous) operational settings at one or more locations along the route 102. Then, when the vehicle system 100 arrives at or approaches the locations, the asynchronous operational settings may be used to control the propulsion-generating vehicles 104 (e.g., autonomously or by directing an operator to manually implement the asynchronous operational settings). Alternatively, the method 200 may be used to convert the operational settings of the synchronous trip plan into the asynchronous operational settings in real time. By "real time," it is meant that, in one embodiment, the operational settings of the synchronous trip plan that are associated with one or more locations along the route 102 (e.g., for implementation by the propulsion-generating vehicles 104 at those locations) can be converted into the asynchronous operational settings after the vehicle system 100 has begun traveling on the route 102 for the trip, but before or just as the vehicle system 100 arrives at the one or more locations. The vehicle system 100 may convert the operational settings on an as-needed basis, such as by converting the operational settings of the synchronous trip plan for a closer first location, and then converting the operational settings of the synchronous trip plan for a farther second location after passing the first location.

With respect to using the handling parameters to convert the operational settings of the synchronous trip plan into asynchronous operational settings, the method 200 may include (e.g., at 208) determining different operational settings for at least two or more of the propulsion-generating vehicles 104 at a location along the route 102 in order to change one or more of the handling parameters, such as to one or more designated values or limits. For example, the method 200 may include attempting to reduce or minimize one or more of the handling parameters by changing the operational settings from the synchronous trip plan. By "minimize," it is meant that the value of one or more of the handling parameters is reduced relative to the handling parameters as determined (e.g., estimated or simulated) from the synchronous trip plan, but not necessarily reduced to the absolute lowest value possible. "Minimizing" also can mean reducing the value to at least a designated limit, but not necessarily the smallest possible value. By way of example only, minimizing the handling parameters can include reducing one or more coupler parameters, terrain excitation parameters, node parameters, and/or neighboring velocity parameters relative to the corresponding coupler parameters, terrain excitation parameters, node parameters, and/or neighboring velocity parameters that are estimated using the synchronous trip plan, but not necessarily to a value of zero.

The designated limits to which the handling parameters are changed may be based on vehicle data and/or route data. For example, the limits may be expressed as a function of the terrain over which the vehicle system travels. As a result, the limits can be different at different locations along the route. As another example, the limits may be expressed as a function of the vehicle size (e.g., weight, weight distribution, length, and the like), the type of vehicle (e.g., the power output capability of the system or vehicle 104), the type of coupler (e.g., the strength, age, and/or health of the couplers), and the like.

The handling parameters that are estimated or simulated using the synchronous operational settings may be referred to as synchronous handling parameters and the handling parameters that are estimated or simulated using asynchronous operational settings may be referred to as asynchronous handling parameters. The handling parameters can be reduced by estimating or simulating the synchronous handling parameters, changing the synchronous operational settings to asynchronous operational settings (while keeping the total power output of the vehicle system 100 at least as large as the total power output that would be obtained using the synchronous operational settings), estimating or simulating the asynchronous handling parameters, and comparing the synchronous handling parameters with the asynchronous handling parameters. Several iterations of this process may be performed so that several potential asynchronous handling parameters and associated asynchronous operational settings are determined. Then, the asynchronous operational settings associated with one or more asynchronous handling parameters that are reduced relative to the synchronous handling parameters may be selected for use at the associated location along the route 102. Additionally or alternatively, a history of handling parameters using synchronous and/or asynchronous operational settings and handling parameters (e.g., as measured and/or estimated) from previous trips of the vehicle system 100 along the route 102 may be used to determine the asynchronous operational settings associated with reduced handling parameters.

In one embodiment, the asynchronous operational settings are directly determined without using a synchronous trip plan (e.g., without using the synchronous operational settings or by basing the asynchronous operational settings on previously generated synchronous operational settings). For example, instead of first obtaining or determining a synchronous trip plan and then determining the asynchronous operational settings from the synchronous trip plan, the asynchronous operational settings may be determined directly from data such as vehicle data and/or route data. In one example, the asynchronous operational settings may be determined by determining one or more solutions to an optimization problem represented by (and referred to as Equation #7):

$$\min_{u_1(x),\ldots,u_n(x)} \alpha(x) \times f(u_1, \ldots, u_n) + \beta(x) \times \text{fuel}(u_1, \ldots, u_n) + \gamma(x) \sum_{i=1}^{n} (u_i - u_{is})^2$$

where $u_i(x), \ldots, u_n(x)$ represent tractive efforts (e.g., power outputs) of the propulsion-generating vehicles 104 numbered 1 through n in the vehicle system 100 that are to be determined by changing the synchronous operational settings (where n represents the number of vehicles 104 having operational settings that are to be modified). For example, $u_i(x), \ldots, u_n(x)$ may represent the variables in the above Equation #7 that are to be solved for and used to determine the asynchronous operational settings. The variable $u_i(x)$ represents the tractive effort provided by the $i^{th}$ propulsion-generating vehicle 104 in the vehicle system 100 at the location (x) using asynchronous operational settings while the variable $u_{is}(x)$ represents the tractive effort provided by the $i^{th}$ propulsion-generating vehicle 104 in the vehicle system 100 at the location (x) using synchronous operational settings. When the tractive efforts $u_i(x), \ldots, u_n(x)$ are determined, then the operational settings that are associated with the tractive efforts $u_i(x), \ldots, u_n(x)$ may be determined (e.g., by identifying which throttle and/or brake settings provides the associated efforts $u_i(x), \ldots, u_n(x)$). Optionally, the variables $u_i(x), \ldots, u_n(x)$ can include or represent the braking efforts provided by the vehicles 104 and/or 106 of the vehicle system 100. The variable x represents a location or distance along the route 102, and may change for different locations for which the tractive efforts $u_i(x), \ldots, u_n(x)$ are being determined.

The function $f(\ )$ can represent a function that captures (e.g., mathematically represents) handling of the vehicle system 100, and is referred to as a vehicle handling function. While the vehicle handling function is shown in Equation #7 as being dependent on the tractive efforts $u_i(x), \ldots, u_n(x)$ of the propulsion-generating vehicles 104, the vehicle handling function may additionally or alternatively be dependent on one or more other factors, such as terrain (e.g., grade and/or curvature of the route 102), a make up of the vehicle system 100 (e.g., the distribution of weight, propulsion-generating vehicles 104, and/or non-propulsion generating vehicles 106 in the vehicle system 100), and/or speeds of the vehicle system 100 using the synchronous operational settings.

The function $\text{fuel}(\ )$ can represent a function that captures (e.g., mathematically represents) how much fuel is consumed by the vehicle system 100 (e.g., by the propulsion-generating vehicles 104) when the tractive efforts $u_1(x), \ldots, u_n(x)$ are generated by the propulsion-generating vehicles 104 at the respective locations (x) along the route 102.

The variables $\alpha$, $\beta$, and $\gamma$ in Equation #7 can represent tuning parameters that may be manually or autonomously changed in order to control the relative weights of different terms in the equation. The variable $\alpha(x)$ can represent a tuning parameter that is based on the total variation or other variation in the grade of the route 102 beneath the vehicle system 100 at a location (x) along the route 102. For example, the variable α(x) can represent roughness of the route 102, which can be defined as:

$$\alpha(x) = \sum_{i=1}^{n-1} |g_i - g_{i+1}|$$ (Equation #8)

where $g_i$ represents the grade of the route 102 underneath the $i^{th}$ vehicle 104 or 106 at the location or distance (x). Optionally, the grade can be scaled by mass of the vehicles 104, 106 in the above Equation #8. In one embodiment, one or more of the variables α, β, and γ may be based on vehicle data and/or route data. For example, α, β, and/or γ may be expressed as a function of the type of vehicles in the vehicle system, the age and/or health of the vehicles, the tractive and/or braking output capabilities of the vehicles, the size of the vehicle system, and the like. As another example, α, β, and/or γ may be expressed as a function of the location of the vehicle system and/or the terrain over which the vehicle system is currently located. As another example, α, β, and/or γ may be expressed as a function of the type, age, and/or health of couplers in the vehicle system.

The variables α, β, and γ may have values that change in order to alter the relative importance (e.g., weight) in the equation on handling of the vehicle system 100, fuel consumption of the vehicle system 100, and how far or close the asynchronous operational settings should remain to the synchronous operational settings (e.g., the degree of change in the operational settings that is allowed to occur). In one example, the values of the variables α, β, and γ may be α(x)=1, β(x)=0, and γ(x)=0, which can result in only the handling performance of the vehicle system 100 being improved, while the impact of changing the operational settings on fuel consumption and the difference between the synchronous and asynchronous operational settings are essentially ignored.

The values of the variables α, β, and γ may change based on distance (x) along the route 102. For example, if α(x) is represented by Equation #8, then the values of β(x) and γ(x) to be nonzero constants can cause more emphasis to be placed on the vehicle handling function in Equation #7 in locations where the terrain beneath the route 102 is relatively more difficult (e.g., variations in the grade are more severe and/or more frequent).

As described above, different values of tractive efforts $u_i(x), \ldots, u_n(x)$ may be inserted into Equation #7 in order to identify tractive efforts $u_i(x), \ldots, u_n(x)$ (e.g., and associated asynchronous operational settings) that reduce one or more of the handling parameters relative to the synchronous operational settings at one or more locations (x) along the route 102. In one embodiment, the potential values of the tractive efforts $u_i(x), \ldots, u_n(x)$ may be limited based on constraints, such as upper and lower magnitude limits and rate bounds (e.g., limitations on how quickly the tractive efforts can change with respect to distance).

Also as described above, because the variable $u_i(x)$ represents the tractive effort provided by the $i^{th}$ propulsion-generating vehicle 104 in the vehicle system 100 at the location (x) using asynchronous operational settings and the variable $u_{is}(x)$ represents the tractive effort provided by the $i^{th}$ propulsion-generating vehicle 104 in the vehicle system 100 at the location (x) using synchronous operational settings, then a constraint that may applied to Equation #7 may be that the values of $u_i(x)$ may need to satisfy the following so that the total effort or total power output of the vehicle system 100 is not decreased by changing from the synchronous operational settings associated with $u_{is}(x)$ to the asynchronous operational settings associated with $u_i(x)$:

$$\sum_{i=1}^{n} u_i(x) = \sum_{i=1}^{n} u_{is}(x)$$ (Equation #9)

The vehicle handling function $f( )$ can be determined by attempting to reduce or minimize one or more of the handling parameters using different asynchronous operational settings (that result in different tractive efforts $u_i(x), \ldots, u_n(x)$ being provided by the propulsion-generating vehicles 104) at one or more locations along the route 102. With respect to the coupler parameters, one or more functions representative of coupler forces or energy stored in the couplers 108 may be used to reduce or minimize the coupler parameters. These functions may be applied to the couplers 108 over the entire vehicle system 100, within a segment of the vehicle system 100, and/or between the first leading propulsion-generating vehicle 104A and the last trailing propulsion-generating vehicle 104G. By way of example only, these functions may include a sum of squares of the forces that are estimated to be exerted on the couplers 108, the maximum value of the forces exerted on the couplers 108 and/or energies stored in the couplers 108, the minimum value of the forces exerted on the couplers 108 and/or energies stored in the couplers 108, the maximum absolute value of the forces exerted on the couplers 108 and/or energies stored in the couplers 108, the sum of the forces exerted on the couplers 108 and/or energies stored in the couplers 108, the absolute sum of the forces exerted on the couplers 108 and/or energies stored in the couplers 108, and the like. Equations 1 and 2 above represent a couple of examples of such functions.

With respect to the terrain excitation parameters, one or more functions representative of the terrain excitation parameters may be used to reduce or minimize the terrain excitation parameters. For example, different combinations of tractive efforts $u_i(x), \ldots, u_n(x)$ may be used in attempts to determine which combination results in a function of the terrain excitation parameters being reduced or minimized. One example of such a function includes:

$$f(\mu) = \sum_{k=1}^{N} e(k)^2$$ (Equation #10)

where $e(k)^2$ represents the square of the terrain excitation parameter for the $k^{th}$ vehicle 104, 106 in the vehicle system 100 including N vehicles 104, 106. The sum of the squares may be determined for the entire vehicle system 100, within a segment of the vehicle system 100, and/or between the first leading propulsion-generating vehicle 104A and the last trailing propulsion-generating vehicle 104G.

Another example of a function of the terrain excitation parameters includes:

$$f(\mu) = k|e(k)|^{max}$$ (Equation #11)

Such a function determines the maximum terrain excitation parameter and may be used to identify the largest terrain excitation parameter in the entire vehicle system 100, within a segment of the vehicle system 100, and/or between the first leading propulsion-generating vehicle 104A and the last trailing propulsion-generating vehicle 104G.

Another example of a function of the terrain excitation parameters includes:

$$f(\mu) = \Sigma |e(k)| \quad \text{(Equation #12)}$$

Such a function determines the sum of the terrain excitation parameters and may be used to identify the sum of the terrain excitation parameters in the entire vehicle system 100, within a segment of the vehicle system 100, and/or between the first leading propulsion-generating vehicle 104A and the last trailing propulsion-generating vehicle 104G.

With respect to the node parameters, different combinations of tractive efforts $u_i(x), \ldots, u_n(x)$ may be used in attempts to determine which combination results in the number of nodes being reduced or minimized and/or which combination results in the rate of movement of one or more nodes being reduced or minimized.

With respect to the neighboring velocity parameters, one or more functions representative of the neighboring velocity parameters may be used to reduce or minimize the neighboring velocity parameters. For example, different combinations of tractive efforts $u_i(x), \ldots, u_n(x)$ may be used in attempts to determine which combination results in a function of the neighboring velocity parameters being reduced or minimized. One example of such a function includes:

$$f(v) = \sum_{i=1}^{N-1} (v_i - v_{i+1})^2 \quad \text{(Equation #13)}$$

where $v_i$ represents the velocity of the $i^{th}$ vehicle 104 or 106 in the vehicle system 100 having N vehicles 104, 106 and the term $(v_i - v_{i+1})$ represents the difference in velocities of neighboring vehicles 104 and/or 106.

Another example of a function of the neighboring velocity parameters includes:

$$f(v) = \left| v_i \overset{max}{-} v_{i+1} \right| \quad \text{(Equation #14)}$$

Such a function determines the maximum difference in velocities of the neighboring vehicles 104 and/or 106 and may be used to identify the neighboring velocity parameter in the entire vehicle system 100, within a segment of the vehicle system 100, and/or between the first leading propulsion-generating vehicle 104A and the last trailing propulsion-generating vehicle 104G.

When the tractive efforts and/or braking efforts $u_i(x), \ldots, u_n(x)$ are identified at one or more locations along the route 102 that reduce the handling parameters relative to the synchronous operational settings, the asynchronous operational settings that correspond to the identified the tractive efforts and/or braking efforts $u_i(x), \ldots, u_n(x)$ are determined. For example, the throttle settings and/or brake settings that are needed for each of the propulsion-generating vehicles 104 to provide the identified tractive efforts and/or braking efforts $u_i(x), \ldots, u_n(x)$ are determined, such as from a table, listing, previously determined relationship between the efforts and the settings, or the like. Flow of the method 200 then proceeds to 210.

At 210, a determination is made as to whether one or more of the asynchronous operational settings can be modified in order to achieve or improve upon a trip objective. As described above, a trip objective can include a reduction in fuel consumption, emission generation, and/or travel time. If one or more of the asynchronous operational settings can be changed in order to reduce fuel consumption, emission generation, and/or travel time (relative to not changing the asynchronous operational settings) while avoiding significant decreases in the improvement in vehicle handling (that is achieved by using the asynchronous operational settings), then the asynchronous operational settings may be modified. On the other hand, if changing the asynchronous operational settings would not result in achieving or improving upon a trip objective, then the asynchronous operational settings may not be changed.

Figure 5:
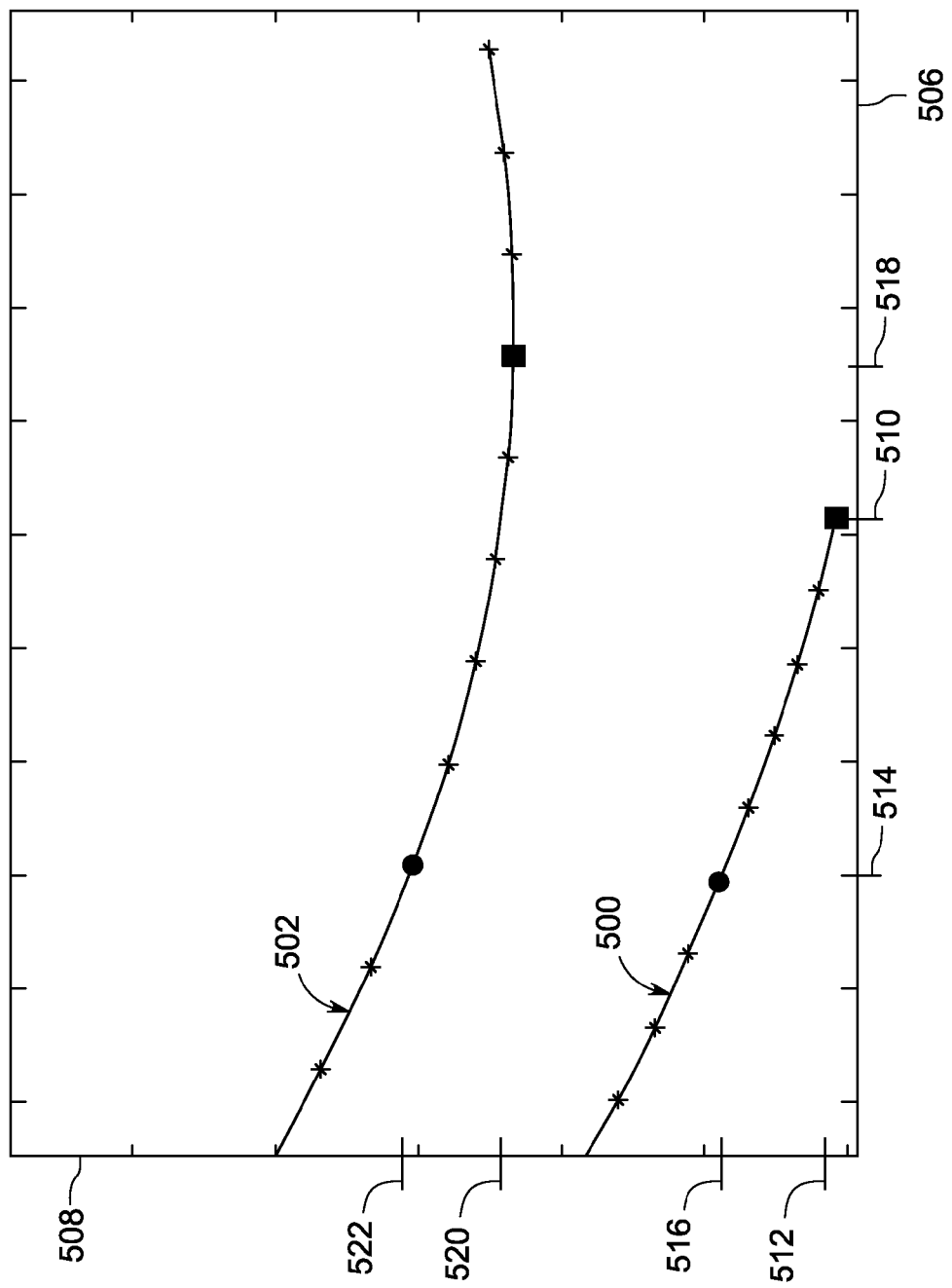
FIG. 5 illustrates two relationships between different asynchronous operational settings and a handling parameter at two different locations along the route 102 shown in FIG. 1 in accordance with one example.

FIG. 5 illustrates two relationships 500, 502 between different asynchronous operational settings and a handling parameter at two different locations along the route 102 (shown in FIG. 1) in accordance with one example. The relationships 500, 502 may each represent how a handling parameter (e.g., a coupler parameter representative of an amount of energy stored in one or more, or all, of the couplers 108 in the vehicle system 100 shown in FIG. 1) varies at each the two different locations if the operational setting (e.g., a throttle setting for a propulsion-generating vehicle 104) is changed. The relationships 500, 502 are shown alongside a horizontal axis 506 representative of the operational parameter and a vertical axis 508 representative of the handling parameter.

For example, the relationship 500 may represent how the handling parameter is expected to change if the operational setting is changed at a first location along the route 102. As shown in FIG. 5, a previous synchronous operational setting may be changed to an asynchronous operational setting at a first value 510 to cause the handling parameter to be minimized or otherwise reduced to a lower value 512 at the first location along the route 102. Changing the first value 510 of the asynchronous operational setting to a second value 514 may achieve or improve upon a trip objective, such as by reducing the throttle setting in order to reduce the amount of fuel consumed by the vehicle system 100. This change, however, also causes the handling parameter to be increased from the lower value 512 to an upper value 516.

The determination of whether to decrease the operational setting to the value 514 may be based on one or more thresholds. For example, if this change in operational setting results in a reduction in fuel consumption and/or a reduction in the amount of emissions generated that is greater than one or more designated threshold amounts, and the change does not result in the handling parameter increasing by more than a designated threshold amount from the lower value 512 to the upper value 516 and/or cause the vehicle system 100 to travel slower than a designated speed or produce less than a designated total power output, then the change may be implemented. If, however, the change results in a reduction in fuel consumption and/or emissions generation that is smaller than a threshold amount, the handling parameter increasing by more than a threshold amount, and/or the vehicle system 100 to travel slower than a designated speed and/or produce less than a designated total power, then the change may not be made to the previously identified asynchronous operational setting.

As another example, the relationship 502 may represent how the handling parameter is expected to change if the operational setting is changed at a different, second location along the route 102. As shown in FIG. 5, a previous synchronous operational setting may be changed to an asynchronous operational setting at a third value 518 to cause the handling parameter to be minimized or otherwise reduced to a lower value 520 at the second location along the route 102. As shown by the relationship 502, increasing or decreasing the operational setting will cause the handling parameter to increase. Increasing the operational setting may not be permitted as doing so may cause the vehicle system 100 to consume excess fuel and/or generate increased emissions. Therefore, the operational setting may be decreased. In one embodiment, the operational setting may be decreased until the handling parameter is increased by no more than a threshold amount or by no more than a designated threshold value. For example, the operational setting may be decreased until the lower value 520 of the handling parameter is increased to an upper limit 522 on the handling parameter.

Returning to the description of the method 200 shown in FIG. 2, at 210, if the asynchronous operational setting can be modified at one or more locations along the route 102 to achieve or improve upon a trip objective, then flow of the method 200 may proceed to 212. Otherwise, the method 200 may proceed to 214.

At 212, the asynchronous operational settings are modified at one or more locations along the route 102. For example, after determining the asynchronous operational settings and determining that the asynchronous operational settings can be changed to achieve or improve upon a trip objective, the asynchronous operational settings that can be changed are modified. As a result, the modified asynchronous operational settings that are so determined can provide at least the total power output that is dictated by the synchronous trip plan at various locations along the route 102, but also improve upon the handling of the vehicle system 100 relative to the synchronous trip plan and achieve one or more trip objectives relative to the synchronous trip plan.

At 214, the asynchronous operational settings (e.g., the asynchronous operational settings that were modified or that were not modified) are used to asynchronously control operations of the vehicle system 100. For example, the asynchronous operational settings can be used to autonomously control operations of the propulsion-generating vehicles 104 along the route 102. Alternatively, the asynchronous operational settings can be used to direct an operator to manually control operations of the propulsion-generating vehicles 104 along the route 102 according to the asynchronous operational settings.

Figure 6:
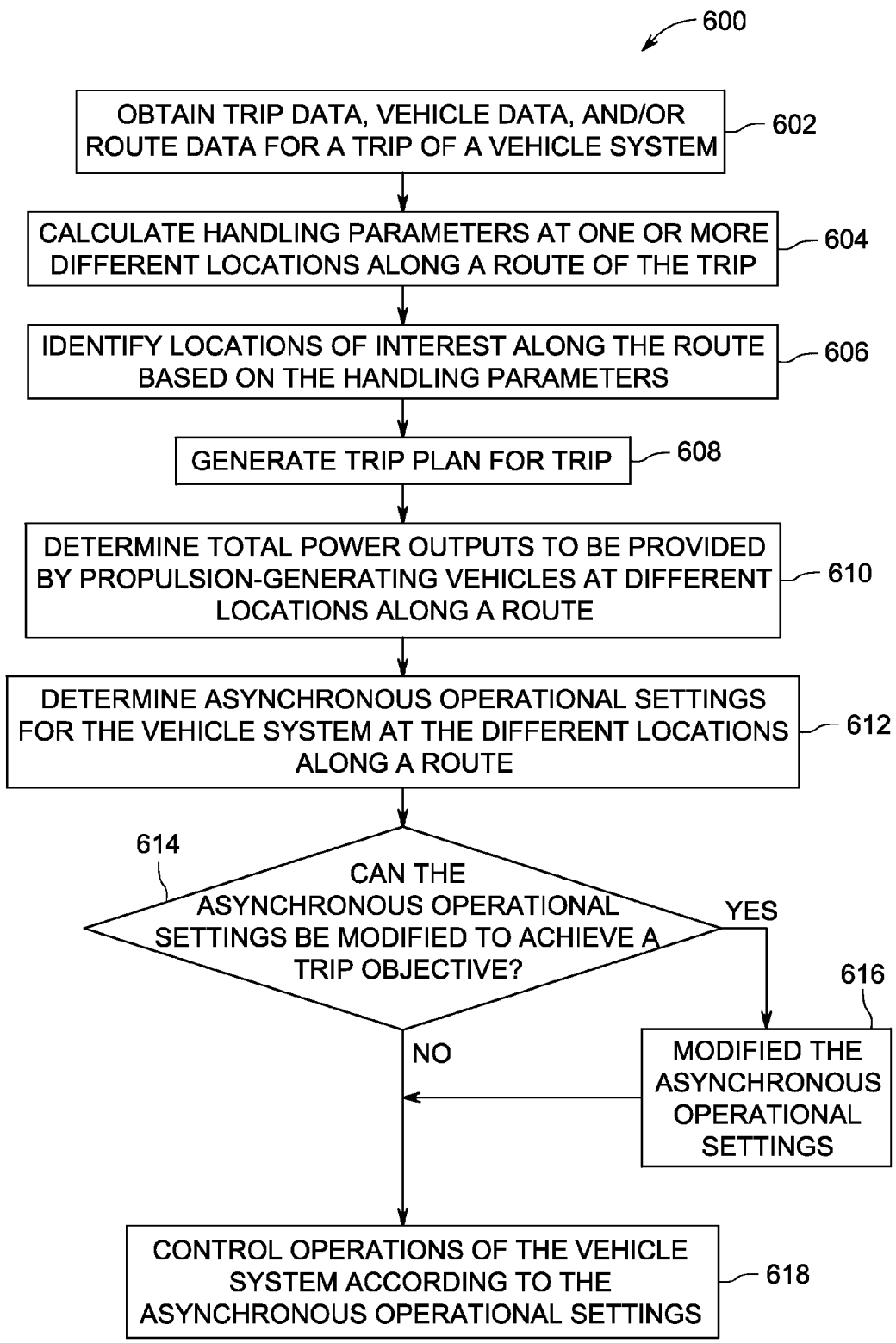
FIG. 6 is a flowchart of another embodiment of a method for operating the vehicle system shown in FIG. 1.

FIG. 6 is a flowchart of another embodiment of a method 600 for operating the vehicle system 100 shown in FIG. 1. The method 600 may be used in conjunction with the vehicle system 100. For example, the method 600 may be used to identify asynchronous operational settings for the vehicle system 100 when no synchronous trip plan is available or is not used to derive the asynchronous operational settings.

At 602, trip data representative of a trip to be traveled or currently being traveled by the vehicle system 100, vehicle data representative of the vehicle system 100, and/or route data representative of the route 102 of the trip are obtained. The data may be obtained from one or more memory devices disposed onboard and/or off-board of the vehicle system 100, such as from a dispatch facility.

At 604, handling parameters are calculated at one or more different locations along the route 102 of the trip. For example, one or more of the handling parameters described above can be estimated from a simulation of travel of the vehicle system 100 and/or from previous trips of the same or similar vehicle system 100 along the route 102. In one embodiment, the terrain excitation parameter is estimated for travel of the vehicle system 100 over the route 102. If throttle and/or brake settings are needed to determine the handling parameters, then default values, historical values (e.g., settings used during a previous trip over the route 102), and/or other values may be used to estimate the handling parameters.

At 606, one or more locations of interest along the route 102 are identified based on the handling parameters. A location of interest may represent a section of the route 102 that may be relatively difficult or complex to control operations of the vehicle system 100 while providing improved handling relative to one or more other sections of the route 102. For example, a section of the route 102 having undulating terrain may be more difficult or complex to control the vehicle system 100 over with improved handling relative to the vehicle system 100 traveling over a relatively flat section of the route 102. In one embodiment, the locations of interest are identified when the handling parameters that are calculated at 604 exceed one or more designated thresholds. For example, the locations along the route 102 where the handling parameters are calculated to be relatively large may be identified as locations of interest.

At 608, a trip plan is created for the trip along the route 102. For example, a trip plan having synchronous operational settings for the propulsion-generating vehicles 104 at various locations along the route 102 may be created. As described above, in one embodiment, the trip plan may be created using one or more embodiments of the subject matter described in the '354 Application. The trip plan may be created using the trip data, vehicle data, and/or route data and may reduce fuel consumed, emissions generated, and/or travel time for the trip relative to the vehicle system 100 traveling along the route 102 for the trip according to another, different trip plan having different synchronous operational settings.

In one embodiment, the trip plan may be created subject to one or more constraints placed on the operational settings used at the locations of interest. For example, a reduced speed limit (e.g., relative to a government or landowner-mandated speed limit) may be applied to the locations of interest and/or a minimum speed limit that the vehicle system 100 is required to maintain may be applied to the locations of interest. Alternatively or additionally, limitations on how often throttle and/or brake settings can be changed in the locations of interest can be placed on the trip plan. Other limitations on movements and/or control of the vehicle system 100 may be applied as well. The trip plan may then be created so that the synchronous operational settings of the trip plan abide by these restrictions on the locations of interest. For example, the trip plan may be created so that the vehicle system 100 is not directed to travel faster than upper speed limits or slower than minimum speed limits at the associated locations of interest.

At 610, total power outputs that are to be provided by the vehicle system 100 are determined at the locations along the route 102. For example, similar to 206 of the method 200 shown in FIG. 2, the total power outputs that are to be provided, in the aggregate, by the propulsion-generating vehicles 104 in the vehicle system 100 may be determined for at least some, or all, the same locations at which the handling parameters are determined at 204.

At 612, asynchronous operational settings for the vehicle system 100 are determined. For example, similar to 208 of the method 200, the total power outputs can be distributed among the propulsion-generating vehicles 104 in the vehicle system 100 at the locations and based on the handling parameters by determining different operational settings for different vehicles 104, 106 at these locations. The total power outputs of the synchronous trip plan may be distributed among the propulsion-generating vehicles 104 by designating the same throttle and/or brake settings for each of the propulsion-generating vehicles 104. Using the handling parameters that are determined at the locations along the route 102, the same total power outputs at these locations can be distributed among the propulsion-generating vehicles 104 by designating different throttle and/or brake settings for the propulsion-generating vehicles 104.

At 614, a determination is made as to whether one or more of the asynchronous operational settings can be modified in order to achieve or improve upon a trip objective. For example, similar to 210 of the method 200, if one or more of the asynchronous operational settings can be changed in order to reduce fuel consumption, emission generation, and/or travel time (relative to not changing the asynchronous operational settings) while avoiding significant decreases in the improvement in vehicle handling (that is achieved by using the asynchronous operational settings), then the asynchronous operational settings may be modified. On the other hand, if changing the asynchronous operational settings would not result in achieving or improving upon a trip objective, then the asynchronous operational settings may not be changed. If the asynchronous operational setting can be modified at one or more locations along the route 102 to achieve or improve upon a trip objective, then flow of the method 600 may proceed to 616. Otherwise, the method 600 may proceed to 614.

At 616, the asynchronous operational settings are modified at one or more locations along the route 102. For example, similar to 212 of the method 200, after determining the asynchronous operational settings and determining that the asynchronous operational settings can be changed to achieve or improve upon a trip objective, the asynchronous operational settings that can be changed are modified. As a result, the modified asynchronous operational settings that are so determined can provide at least the total power output that is dictated by the synchronous trip plan at various locations along the route 102, but also improve upon the handling of the vehicle system 100 relative to the synchronous trip plan and achieve one or more trip objectives relative to the synchronous trip plan.

At 618, the asynchronous operational settings are used to asynchronously control operations of the vehicle system 100. For example, similar to 214 of the method 200, the asynchronous operational settings can be used to autonomously control operations of the propulsion-generating vehicles 104 along the route 102. Alternatively, the asynchronous operational settings can be used to direct an operator to manually control operations of the propulsion-generating vehicles 104 along the route 102 according to the asynchronous operational settings.

In another embodiment, instead of determining the asynchronous operational settings from a synchronous trip plan and/or determining the asynchronous operational settings at the locations associated with larger handling parameters, a trip plan may be created in order to "optimize" (e.g., improve) the handling of the vehicle system 100 and one or more trip objectives. For example, a trip plan may be created from the trip data, vehicle data, route data, and/or handling parameters, with the trip plan decreasing the handling parameters at locations along the route 102 while also reducing fuel efficiency, reducing the generation of emissions, and/or reducing travel time of the trip, as described herein. For example, the trip plan may be created a single time with the objectives of improving both handling and improving one or more objectives of the trip.

Figure 7:
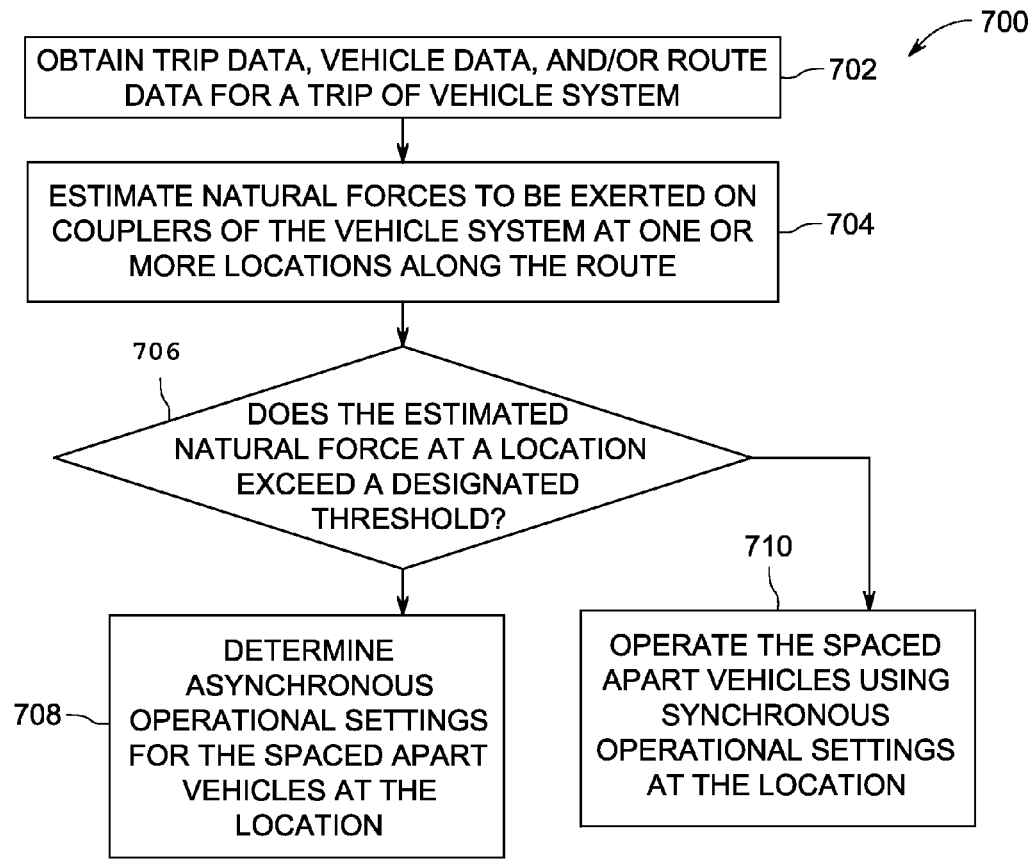
FIG. 7 is a flowchart of another embodiment of a method for operating the vehicle system shown in FIG. 1.

FIG. 7 is a flowchart of another embodiment of a method 700 for operating the vehicle system 100 shown in FIG. 1. The method 700 may be used in conjunction with the vehicle system 100. For example, the method 700 may be used to identify asynchronous operational settings for the vehicle system 100 when no synchronous trip plan is available or is not used to derive the asynchronous operational settings.

At 702, trip data representative of a trip to be traveled or currently being traveled by the vehicle system 100, vehicle data representative of the vehicle system 100, and/or route data representative of the route 102 of the trip are obtained. The data may be obtained from one or more memory devices disposed onboard and/or off-board of the vehicle system 100, such as from a dispatch facility. A trip plan formed from synchronous operational settings for the propulsion-generating vehicles 104 may be created from the trip data, vehicle data, and/or route data, as described above, or received from an off-board source. Alternatively, the route data alone may be obtained at 702.

At 704, natural forces that are to be exerted on the vehicle system 100 during travel along the route 102 during the trip are estimated. The natural forces exerted on the vehicle system 100 may be handling parameters that are used to determine operational settings for the propulsion-generating vehicles 104 and to improve the handling of the vehicle system 100. The natural forces include the forces exerted on the couplers 108 (e.g., as predicted by a rigid rope model of the vehicle system 100 when only the gravitational forces on the vehicle system 100 are considered). These estimated natural forces may be dependent on the terrain and may be independent of the propulsion-generating vehicles 104 (e.g., independent of the tractive efforts generated by the vehicles 104), drag forces, air-brake forces, and/or other operational parameters. The natural forces may be estimated for one or more couplers 108 disposed between propulsion-generating vehicles 104 in the vehicle system 100. In one embodiment, the natural forces are determined for a segment of the vehicle system 100 that includes one or more non-propulsion generating vehicles 106 that are disposed between and that interconnect two or more propulsion-generating vehicles 104. Alternatively or additionally, the natural forces may be determined for the entire vehicle system 100 and/or for multiple segments of the vehicle system 100.

The natural forces exerted on couplers 108 may be estimated using route data that is representative of the route 102 (e.g., curvature and/or grade), and/or vehicle data that is representative of the size (e.g., mass) of the vehicle system 100 and/or a segment of the vehicle system 100:

$$F_{i-1} - F_i = m_i g_i + m_i \dot{v} \qquad \text{(Equation \#15)}$$

where $F_i$ represents the natural force exerted on the $i^{th}$ coupler 108 in the vehicle system 100, $F_{i-1}$ represents the natural force exerted on the $(i-1)^{th}$ coupler 108 in the vehicle system 100, $m_i$ represents the mass of the $i^{th}$ vehicle 104 or 106, $g_i$ represents the mean, average, or effective grade of the route 102 beneath the vehicle system 100, and $\dot{v}$ represents the acceleration of the vehicle system 100. The acceleration ($\dot{v}$) may be the acceleration that is caused by gravitational force and can be represented as:

$$\dot{v} = \frac{\sum_{i=1}^{N} m_i g_i}{\sum_{i=1}^{N} m_i} \qquad \text{(Equation \#16)}$$

As a result, the natural force exerted on the coupler 108 may be defined as:

$$F_i = \sum_{j=1}^{i} m_j g_j + m_j \dot{v} \qquad \text{(Equation \#17)}$$

If the natural force is positive at a coupler 108 (e.g., greater than zero), the natural force can indicate that gravity tends to stretch the coupler 108. Conversely, if the natural force is negative at the coupler 108 (e.g., less than zero), the natural force can indicate that gravity tends to compress the coupler 108. The estimated natural forces can be used to determine a differential power (or effort) between the propulsion-generating vehicles 104 on opposite sides of the coupler 108 (but not necessarily directly connected to the coupler 108).

In one embodiment, the natural forces are used to determine a bunching power for the propulsion-generating vehicles 104 that are on opposite sides of the coupler 108. The bunching power can represent the total differential power output with respect to a synchronous power output that is to be generated by these propulsion-generating vehicles 104. For example, the bunching power can represent a total difference between the power output of the vehicles (as calculated using one or more methods described herein) and the power output of the vehicles if the vehicles were using synchronous operational settings. As one example, the bunching power can be expressed as:

$$B = \begin{cases} K(p-n) & \text{if } |p-n| > t \\ 0 & \text{otherwise} \end{cases} \qquad \text{(Equation \#18)}$$

where k represents a spring constant of the spring model of the coupler 108, p represents a positive natural force (e.g., the maximum positive natural force) exerted on the coupler 108, n represents an absolute value of a negative natural force (e.g., the maximum absolute negative natural force) exerted on the coupler 108, B represents an estimated bunching effort or power, and t represents a designated threshold.

As a result, if the positive natural force p is larger than the threshold t plus the absolute negative natural force n, then the estimated bunching effort or power B is proportional to the difference between the positive natural force and the absolute value of the negative natural force. If the absolute negative natural force n is larger than the threshold t plus the positive natural force p, then the estimated bunching effort or power B is proportional to the difference between the positive natural force and the absolute value of the negative natural force. Otherwise, the estimated bunching effort or power B is set to zero.

When the natural force on a coupler 108 is larger than the natural compressive force on the coupler 108, the bunching effort B is positive, which can indicate that the vehicle system 100 can be compressed to compensate for the gravity stretching the vehicle system 100. Similarly, when the natural compressive force is larger than the natural stretch force on the coupler 108, the bunching effort B is negative, which can indicate that the vehicle system 100 can be stretched to compensate for the natural forces.

At 706, a determination is made as to whether the estimated natural force on one or more couplers 108 exceeds a designated threshold. For example, the natural force that is estimated to be exerted on a coupler 108 at a location along the route 102 may be compared to a threshold. If the natural force exceeds a designated threshold, then the natural force may be sufficiently large to warrant designating different operational settings (e.g., asynchronous operational settings) for the propulsion-generating vehicles 104 disposed on opposite sides of the coupler 108 in order to compensate for the natural force. Such relatively large natural forces may decrease handling of the vehicle system 100 and may be undesirable for the control of the vehicle system 100. If the estimated natural force indicates that the coupler 108 may experience a relatively large tensile force at a location along the route 102, then the operational settings of the propulsion-generating vehicles 104 may be designated to compress the coupler 108. Alternatively, if the estimated natural force indicates that the coupler 108 may experience a relatively large compressive force at a location along the route 102, then the operational settings of the propulsion-generating vehicles 104 may be designated to stretch the coupler 108. As a result, flow of the method 700 may proceed to 708.

On the other hand, if the estimated natural force does not exceed the threshold, then the natural force may not be sufficiently large to warrant designating asynchronous operational settings for the propulsion-generating vehicles 104 disposed on opposite sides of the coupler 108 in order to compensate for the natural force. For example, if the estimated natural force indicates that the coupler 108 may experience a relatively small tensile or compressive force, then the natural force may not significantly impact the handling of the vehicle system 100 in a negative or undesirable manner. As a result, flow of the method 700 may proceed to 710.

At 708, asynchronous operational settings for the propulsion-generating vehicles 104 disposed on opposite sides of the coupler 108 are determined. The asynchronous operational settings may be based on the bunching effort or horsepower. For example, the asynchronous operational settings may be determined so that the total (e.g., aggregate) power output that is to be generated by the propulsion-generating vehicles 104 on opposite sides of the coupler 108 is the bunching effort or horsepower. The bunching effort or horsepower may be the effort (B) determined above using Equation #18 or another effort or horsepower that reduces the estimated natural force on the coupler 108. The asynchronous operational settings may be used to control operations of the propulsion-generating vehicles 104, such as by automatically implementing the asynchronous operational settings or by directing an operator of the vehicle system 100 to manually implement the asynchronous operational settings at the location associated with the estimated natural force on the coupler 108.

At 710, the propulsion-generating vehicles 104 disposed on opposite sides of the coupler 108 for which the natural force is estimated are controlled using synchronous (e.g., the same) operational setting, such as the same throttle settings. For example, because the estimated natural force may be relatively small, the synchronous operational settings of a trip plan may be used for the propulsion-generating vehicles 104 instead of changing the operational settings to asynchronous operational settings.

Figure 8:
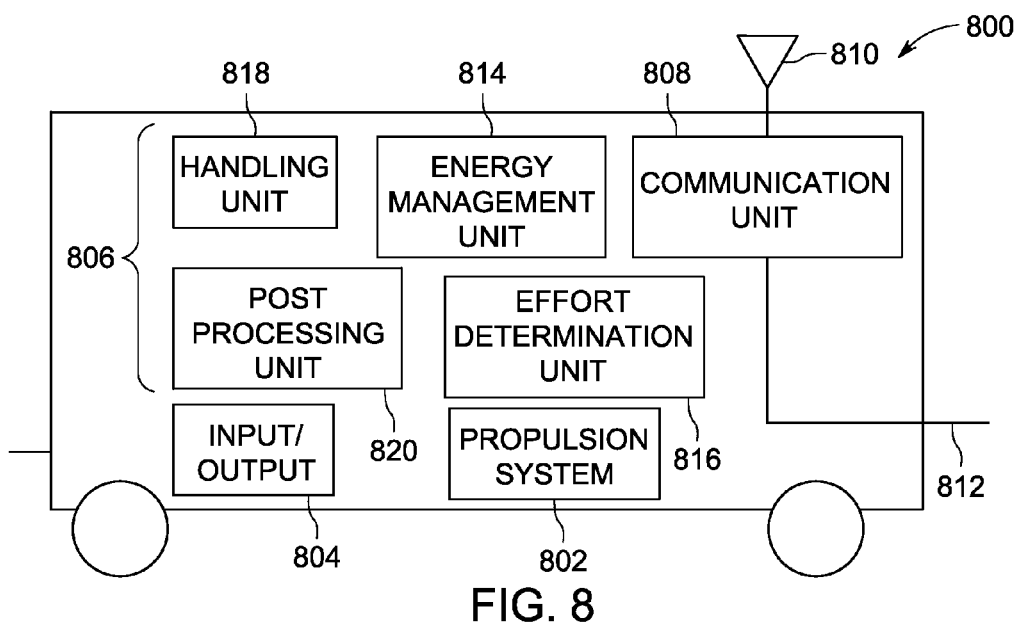
FIG. 8 is a schematic diagram of one embodiment of a propulsion-generating vehicle.

FIG. 8 is a schematic diagram of one embodiment of a propulsion-generating vehicle 800. The propulsion-generating vehicle 800 may represent one or more of the propulsion-generating vehicles 104 shown in FIG. 1. The propulsion-generating vehicle 800 includes a propulsion system 802, which can include one or more engines, motors, brakes, batteries, cooling systems (e.g., radiators, fans, etc.), and the like, that operate to generate power output to propel the vehicle 800. One or more input and/or output devices 804 ("Input/Output 804" in FIG. 8), such as keyboards, throttles, switches, buttons, pedals, microphones, speakers, displays, and the like, may be used by an operator to provide input and/or monitor output of one or more systems of the vehicle 800.

The propulsion-generating vehicle 800 includes an onboard control system 806 that controls operations of the propulsion-generating vehicle 800. For example, the control system 806 may determine the asynchronous operational settings for the vehicle 800 and at least one other propulsion-generating vehicle in the same vehicle system. Alternatively, the control system 806 may entirely or partially be disposed off-board the vehicle 800, such as at a dispatch facility or other facility. The vehicle system 100 (shown in FIG. 1) that may include the propulsion-generating vehicle 800 may include only a single vehicle 800 having the control system 806 that receives or determines the asynchronous operational settings described herein. Alternatively, the vehicle system 100 may have multiple vehicles 800 with the control systems 806 that receive or determine the asynchronous operational settings.

Other propulsion-generating vehicles in the vehicle system 100 may be controlled based on the asynchronous operational settings that are communicated from the propulsion-generating vehicle 800 that has the control system 806 in order to control the operations of the other propulsion-generating vehicles. Alternatively, several propulsion-generating vehicles 800 in the vehicle system 100 may include the control systems 806 and assigned priorities among the control systems 806 may be used to determine which control system 806 controls operations of the propulsion-generating vehicles 800.

The control system 806 is communicatively coupled with a communication unit 808. The communication unit 808 communicates with one or more off-board locations, such as another vehicle (e.g., another propulsion-generating vehicle in the same vehicle system 100, a dispatch facility, another vehicle system, or the like). The communication unit 808 can communicate via wired and/or wireless connections (e.g., via radio frequency). The communication unit 808 can include a wireless antenna 810 and associated circuitry and software to communicate wirelessly. Additionally or alternatively, the communication unit 808 may be connected with a wired connection 812, such as one or more buses, cables, and the like, that connect the communication unit 808 with another vehicle in the vehicle system or consist (e.g., a trainline, multiple unit cable, electronically controlled pneumatic brake line, or the like). The communication unit 808 can be used to communicate (e.g., transmit and/or receive) a variety of information described herein. For example, the communication unit 808 can receive the trip plan having synchronous operational settings, trip data, route data, vehicle data, operational settings from another propulsion-generating vehicle 800 and/or another control unit 806, and/or other information that is used to determine the handling parameters and asynchronous operational settings described herein. The communication unit 808 can transmit asynchronous operational settings, such as the asynchronous operational settings determined by the control system 806 and/or received from an off-board source, to one or more other propulsion-generating vehicles in the vehicle system 100. These transmitted asynchronous operational settings are used to direct the operations of the other propulsion-generating vehicles.

The control system 806 includes units that perform various operations. The control system 806 and one or more of the units may represent a hardware and/or software system that operates to perform one or more functions described herein. For example, the control system 806 and/or the illustrated units may include one or more computer processor(s), controller(s), or other logic-based device(s) that perform operations based on instructions stored on a tangible and non-transitory computer readable storage medium. Alternatively, the control system 806 and/or the units may include one or more hard-wired devices that perform operations based on hard-wired logic of the devices. The control system 806 and/or the units shown in FIG. 8 may represent the hardware that operates based on software or hardwired instructions, the software that directs hardware to perform the operations, or a combination thereof.

In the illustrated embodiment, the control system 806 includes an energy management unit 814 that receives input to create a trip plan. For example, the energy management unit 814 may receive trip data, vehicle data, and/or route data in order to create a trip plan having synchronous operational settings. As described above, such a trip plan may be used to determine asynchronous operational settings to improve the handling of the vehicle system 100 and/or to identify locations of interest along the route 102 where the asynchronous operational settings are to be determined in order to improve handling. Additionally or alternatively, the energy management unit 814 may create the trip plan with asynchronous operational settings, and may do so by attempting to reduce one or more of the handling parameters while also reducing the fuel consumed by the vehicle system 100, the emissions generated by the vehicle system 100, and/or the travel time to complete the trip. For example, the energy management unit 814 may determine the asynchronous operational settings for the propulsion-generating vehicles 104, 800 of the vehicle system 100 at one or more locations along the route 102 in order to reduce the handling parameters, fuel consumed, emissions generated, and/or travel time relative to another trip plan for the same trip and same vehicle system 100 that includes synchronous operational settings at one or more of the locations. Optionally, the energy management unit 814 that determines the synchronous and/or asynchronous trip plan may be disposed off-board of the vehicle 800 and may communicate the trip plan to the control system 806.

An effort determination unit 816 examines the trip plan to determine the total power output demanded from the propulsion-generating vehicles 104, 800 in the vehicle system 100 by the trip plan at one or more locations along the route 102. For example, the effort determination unit 816 can identify the estimated or anticipated power outputs of each of the propulsion-generating vehicles based on the designated operational settings (e.g., throttle notch positions) in the trip plan and then sum these power outputs to determine the total power output to be provided by the vehicle system 100.

A handling unit 818 calculates one or more handling parameters described above. The handling unit 818 can estimate the values of the handling parameters at one or more locations along the route 102, as described above. The handling unit 818 can determine these handling parameters using the operational settings designated by the trip plan, also as described above.

A post processing unit 820 determines the asynchronous operational settings for two or more of the propulsion-generating vehicles in the vehicle system. For example, the post processing unit 820 can examine the total power outputs derived from the trip plan by the effort determination unit 816 and the handling parameters estimated by the handling unit 818. The post processing unit 820 may then determine asynchronous operational settings that improve handling of the vehicle system 100 (e.g., by reducing one or more of the handling parameters) while providing the total power outputs of the vehicle system 100, as described above. The post processing unit 820 may optionally determine if the asynchronous operational settings can be modified to achieve or improve upon one or more trip objectives, such as fuel consumption, travel time, emissions generation, and the like.

A controller unit 822 forms instructions that are based on the asynchronous operational settings to control movement of the propulsion-generating vehicle 800 and/or one or more other propulsion-generating vehicles in the vehicle system 100. For example, the controller unit 822 can create one or more data signals or packets that represent the asynchronous operational settings determined by the post processing unit 820. These instructions may be communicated to the propulsion system 802 of the vehicle 800 and/or to similar propulsion systems of other propulsion-generating vehicles in the same vehicle system 100 to autonomously control movements of the propulsion-generating vehicles. The propulsion systems that receive the instructions may automatically implement the throttle and/or brake settings dictated by the asynchronous operational settings. Optionally, the instructions may be communicated to the one or more output devices 804 of the vehicle 800 and/or one or more similar output devices on other propulsion-generating vehicles in the vehicle system 100 to direct one or more operators on how to manually change throttle and/or brake settings of the propulsion-generating vehicles according to the asynchronous operational settings.

In one embodiment, the controller unit 822 may determine the actual speed of the propulsion-generating vehicle 800 and/or one or more other propulsion-generating vehicles in the vehicle system 100. For example, the controller unit 822 may receive or measure data from the propulsion system 802 that represents the actual speed of the propulsion-generating vehicle 800. This data may be obtained from a speed sensor that is included in the propulsion system 802. Additionally or alternatively, the controller unit 822 may receive similar data from other propulsion-generating vehicles in the vehicle system 100.

The controller unit 822 can compare the actual speed of the propulsion-generating vehicle 800, the other propulsion-generating vehicles, and/or the vehicle system 100 (e.g., which may be represented by the actual speeds of one or more of the propulsion-generating vehicles) to a speed that is designated by a trip plan (e.g., a synchronous or asynchronous trip plan). If the actual speed differs from the designated speed, the controller unit 822 may identify a change in throttle settings and/or brake settings for one or more of the propulsion-generating vehicles in the vehicle system 100 that can be used to reduce or eliminate the difference between the actual and designated speeds. The controller unit 822 may direct (e.g., by transmitting instructions) to one or more of the propulsion-generating vehicles to change the respective throttle settings and/or brake settings to reduce or eliminate the difference between the actual and designated speeds. The controller unit 822 may also determine a corresponding change in the throttle settings and/or brake settings of one or more other propulsion-generating vehicles in order to maintain improved handling of the vehicle system 100. For example, if a group bunching effort is being maintained between two or more propulsion-generating vehicles or consists of propulsion-generating vehicles, then a change in the throttle settings of one vehicle or consist to cause the actual speed to match the designated speed may require a change in the throttle settings of another vehicle or consist in order to maintain the group bunching effort. The controller unit 822 can identify this change in the settings of the other vehicle or consist and communicate the change to the other vehicle or consist for implementation.

Although connections between the components in FIG. 8 are not shown, two or more (or all) of the illustrated components may be connected by one or more wired and/or wireless connections, such as cables, busses, wires, wireless networks, and the like.

In one embodiment, a method (e.g., for determining operational settings for a vehicle system having multiple vehicles connected with each other by couplers to travel along a route) includes identifying total power outputs to be provided by propulsion-generating vehicles of the vehicles in the vehicle system. The total power outputs are determined for different locations of the vehicle system along the route. The method also includes calculating handling parameters of the vehicle system at one or more of the different locations along the route. The handling parameters are representative of at least one of forces exerted the couplers, energies stored in the couplers, relative velocities of neighboring vehicles of the vehicles in the vehicle system, or natural forces exerted on one or more segments of the vehicle system between two or more of the propulsion-generating vehicles. The method also includes determining asynchronous operational settings for the propulsion-generating vehicles at the different locations along the route. The asynchronous operational settings represent different operational settings for the propulsion-generating vehicles that cause the propulsion-generating vehicles to provide at least the total power outputs at the respective different locations while changing the handling parameters of the vehicle system to one or more designated values at the different locations along the route. The method further includes communicating the asynchronous operational settings to the propulsion-generating vehicles in order to cause the propulsion-generating vehicles to implement the asynchronous operational settings at the different locations.

In another aspect, the asynchronous operational settings are determined by identifying the different operational settings for the propulsion-generating vehicles that reduce the handling parameters relative to different handling parameters associated with using synchronous operational settings for the propulsion-generating vehicles at the respective different locations to provide the total power outputs at the respective different locations.

In another aspect, the handling parameters include coupler parameters representative of at least one of the forces exerted on the couplers or the energies stored in the couplers.

In another aspect, the handling parameters include terrain excitation parameters representative of at least one of grades of the route at the respective different locations, masses of one or more of the vehicles in the vehicle system at the respective different locations, or tractive efforts provided by one or more of the propulsion-generating vehicles at the respective different locations.

In another aspect, identifying one or more nodes in the vehicle system, the one or more nodes representative of an estimated force exerted on a coupler that has an absolute value that is less than a designated threshold. The handling parameters include node parameters representative of at least one of a number of the nodes in the vehicle system or a rate of movement of the nodes in the vehicle system.

In another aspect, the handling parameters include neighboring velocity parameters representative of the relative velocities of neighboring vehicles of the vehicles in the vehicle system and determined by identifying estimated differences in estimated speed between the neighboring vehicles in the vehicle system.

In another aspect, the method includes modifying the asynchronous operational settings to reduce at least one of an amount of fuel to be consumed by the vehicle system, an amount of emissions to be generated by the vehicle system, or a travel time of the vehicle system for the trip while maintaining a resulting increase in the handling parameters below a designated threshold.

In another aspect, the handling parameters include the natural forces that are representative of one or more tensile or compressive forces exerted on the one or more segments of the vehicle system from a gravitational force.

In another aspect, the total power outputs to be provided by propulsion-generating vehicles are identified from a synchronous trip plan that designates synchronous operational settings for the propulsion-generating vehicles at the locations. When the vehicle system travels along the route according to the synchronous trip plan causes the vehicle system to reduce at least one of fuel consumed, emissions generated, or travel time relative to another, different trip plan that designates one or more other, different synchronous operational settings.

In another aspect, the method also includes at least one of autonomously implementing the asynchronous operational settings at the different locations or communicating the asynchronous operational settings for the vehicle system at one or more of a current location or an upcoming location to an operator of the vehicle system for the operator to manually implement the asynchronous operational settings.

In another aspect, the method also includes modifying the one or more designated values to which the handling parameters are changed based on at least one of a terrain of the route, a mass distribution of the vehicle system, a type of the vehicle system, or a type of the couplers in the vehicle system.

In one embodiment, a system (e.g., a control system for a vehicle system) includes an effort determination unit configured to identify total power outputs to be provided by a vehicle system that includes multiple vehicles connected with each other by couplers to travel along a route. The effort determination unit also is configured to identify the total power outputs to be provided by propulsion-generating vehicles of the vehicles in the vehicle system at different locations of the vehicle system along the route. The system includes a handling unit configured to calculate handling parameters of the vehicle system at one or more of the different locations along the route. The handling parameters are representative of at least one of forces exerted the couplers, energies stored in the couplers, relative velocities of neighboring vehicles of the vehicles in the vehicle system, or natural forces exerted on one or more segments of the vehicle system between two or more of the propulsion-generating vehicles. The system includes a processing unit configured to determine asynchronous operational settings for the propulsion-generating vehicles at the different locations along the route. The asynchronous operational settings represent different operational settings for the propulsion-generating vehicles that cause the propulsion-generating vehicles to provide at least the total power outputs at the respective different locations while changing the handling parameters of the vehicle system to one or more designated values at the different locations along the route. The asynchronous operational settings are configured to be communicated to the propulsion-generating vehicles in order to cause the propulsion-generating vehicles to implement the asynchronous operational settings at the different locations.

In another aspect, the processing unit is configured to identify the different operational settings for the propulsion-generating vehicles that reduce the handling parameters relative to different handling parameters associated with using synchronous operational settings for the propulsion-generating vehicles at the respective different locations to provide the total power outputs at the respective different locations.

In another aspect, the handling parameters include coupler parameters representative of at least one of the forces exerted on the couplers or the energies stored in the couplers.

In another aspect, the handling parameters include terrain excitation parameters based on at least one of grades of the route at the respective different locations, masses of one or more of the vehicles in the vehicle system at the respective different locations, or tractive efforts provided by one or more of the propulsion-generating vehicles at the respective different locations.

In another aspect, the handling unit is configured to identify one or more nodes in the vehicle system. The one or more nodes are representative of an estimated force exerted on a coupler that has an absolute value that is less than a designated threshold. The handling parameters include node parameters representative of at least one of a number of the nodes in the vehicle system or a rate of movement of the nodes in the vehicle system.

In another aspect, the handling parameters include neighboring velocity parameters representative of the relative velocities of neighboring vehicles of the vehicles in the vehicle system and determined by identifying estimated differences in estimated speed between the neighboring vehicles in the vehicle system.

In another aspect, the processing unit is configured to modify the asynchronous operational settings to reduce at least one of an amount of fuel to be consumed by the vehicle system, an amount of emissions to be generated by the vehicle system, or a travel time of the vehicle system for the trip while maintaining a resulting increase in the handling parameters below a designated threshold.

In one embodiment, a method (e.g., for determining operational settings for a vehicle system having two or more propulsion-generating vehicles coupled with each other by one or more non-propulsion generating vehicles) includes obtaining route data and vehicle data. The route data is representative of one or more grades of a route at one or more locations along the route that is to be traveled by the vehicle system. The vehicle data is representative of a size of the one or more non-propulsion generating vehicles disposed between the propulsion-generating vehicles. The method also includes calculating one or more estimated natural forces that are to be exerted on couplers connected with the one or more non-propulsion generating vehicles of the vehicle system at the one or more locations along the route. The one or more estimated natural forces are based on the size of the one or more non-propulsion generating vehicles and the one or more grades of the route at the one or more locations along the route. The method also includes determining asynchronous operational settings to be implemented by the two or more propulsion-generating vehicles at the one or more locations along the route. Implementing the asynchronous operational settings by the two or more propulsion-generating vehicles reduces one or more actual natural forces that are actually exerted on the couplers to forces that are smaller than the one or more estimated natural forces when the vehicle system travels over the one or more locations along the route.

In another aspect, when the one or more estimated natural forces are tensile forces, the asynchronous operational settings instruct the two or more propulsion-generating vehicles to implement at least one of different throttle settings or different brake settings to compress the couplers connected with the non-propulsion generating vehicles.

In another aspect, when the one or more estimated natural forces are compressive forces, the asynchronous operational settings instruct the two or more propulsion-generating vehicles to implement at least one of different throttle settings or different brake settings to stretch the couplers connected with the non-propulsion generating vehicles.

In one embodiment, a method (e.g., for determining operational settings of a vehicle system) includes obtaining route data and vehicle data. The route data is representative of one or more grades of a route at one or more locations along the route that is to be traveled by a vehicle system having two or more propulsion-generating vehicles coupled with each other by one or more non-propulsion generating vehicles. The vehicle data is representative of a size of the one or more non-propulsion generating vehicles disposed between the propulsion-generating vehicles. The method also includes calculating handling parameters of the vehicle system at one or more different locations along the route based on the route data and the vehicle data. The handling parameters are representative of at least one of forces expected to be exerted the couplers, energies expected to be stored in the couplers, expected relative velocities of neighboring vehicles of the vehicles in the vehicle system, or expected natural forces exerted on one or more segments of the vehicle system between two or more of the propulsion-generating vehicles. The method further includes determining asynchronous operational settings to be implemented by the two or more propulsion-generating vehicles at the one or more locations along the route based on the handling parameters. The asynchronous operational settings are determined by identifying a combination of the asynchronous operational settings at the different locations along the route that result in the handling parameters being decreased to one or more designated limits.

Additional inventive subject matter described herein relates to ways of determining the asynchronous operational settings described above for a current or upcoming trip of a vehicle system. Specifically, methods of computing power and/or brake settings (also called notches) to propulsion-generating vehicles in the vehicle system in order to obtain improved train handling (relative to operating the vehicle system in another manner) are disclosed. In one aspect, the vehicle system is operated as a distributed power (DP) vehicle system. The vehicle system includes propulsion-generating vehicles placed at different locations in the vehicle system, and operating these propulsion-generating vehicles using different operational settings (e.g., different notches) at the same time. As described above, the propulsion-generating vehicles can be divided into groups in the vehicle system. In one example, these groups may be identified by placing one or more virtual "fences" between the different groups of propulsion-generating vehicles. A fence can be used to demarcate different groups of propulsion-generating vehicles, which can be referred to as consists. The propulsion-generating vehicles in the different groups are allowed (but not required) to have different operational settings (e.g., notches). For example, the vehicles in the same group can have the same operational setting, or notch, at a given time.

In one embodiment, the system and method described herein uses model predictive control (MPC) to determine the time and/or location along a route being traveled by the vehicle system to change which vehicles are included in the different groups to improve handling parameters of the vehicle system while satisfying other constraints (e.g., limitations on the frequency of changes in which vehicles are in which groups, bunching horsepower at the time of movement, and the like). MPC can include calculating or estimating handling parameters for the vehicle system at different locations and/or times along a route for an upcoming portion of a trip. These handling parameters may be calculated or estimated multiple times for the same location of the vehicle system and/or time along the trip, with different handling parameters calculated for different vehicle groupings and/or fence positions. The handling parameters are predicted for an upcoming trip (e.g., prior to the vehicle system beginning to move for the trip) and/or for an upcoming segment of the trip (e.g., while the vehicle system is moving during the trip). Different sequences of changes to the vehicle groupings and/or fence positions may be examined and compared with each other to identify the sequence or sequences that improve (e.g., increase or reduce, as appropriate) the handling parameters the most, more than one or more other sequences (but not necessarily all other sequences), or by at least a designated threshold amount.

In another embodiment, the times and/or locations where changes in which vehicles are included in which groups (also referred to as movement points or change points) can be found by examining an entire planned trip of the vehicle system. Alternatively, other techniques can be used.

In another embodiment, the movement points or change points are determined by using a "categorize and merge" technique. In this technique, each movement point is categorized as either TBD (e.g., the fence position can be in any location in the vehicle system or the vehicles may be in any group) or a selected position (e.g., a specific fence position in the vehicle system or the vehicles are in specific groups). The category TBD is selected when the groupings of the vehicles do not differ significantly from each other in benefit. Otherwise, the groupings of the vehicles with the most significant benefit, or that has a more significant benefit than one or more other groupings of the vehicles, is selected. Then, an iterative searching technique is used to merge or split TBD segments into selected groupings of the vehicles to satisfy the constraints. As used herein, the term "groupings" refers to a state of groups of the vehicles, such as an identification of which vehicles are included in which groups at a given or selected time.

The subject matter described herein solves a problem of ensuring improved automatic handling of the vehicle system in several manners, including by making use of asynchronous distributed power operation (e.g., by allowing different propulsion-generating vehicles in a vehicle system to have different power settings). Additionally, the subject matter changes which vehicles are included in which groups within the vehicle system to further improve train handling. The change in which vehicles are included in which groups can be performed by moving locations of the virtual fences. While some vehicle systems have been using empirical "rules of thumb" and heuristics to control vehicle systems and keep the vehicle systems bunched so that slack action in the vehicle system does not run out, these rules usually lack physical or mathematical justification. Moreover, these rules rapidly become complicated to use for a human operator (even more so if the number of groups or fences increases), who must control speed, brakes, and other variables in addition to modulating multiple notches to obtain acceptable handling of the vehicle system. Additionally, it can be difficult for an operator to determine deviations from a synchronous plan, based on the distribution of weight in the vehicle system, terrain properties, and speed.

Figure 9:
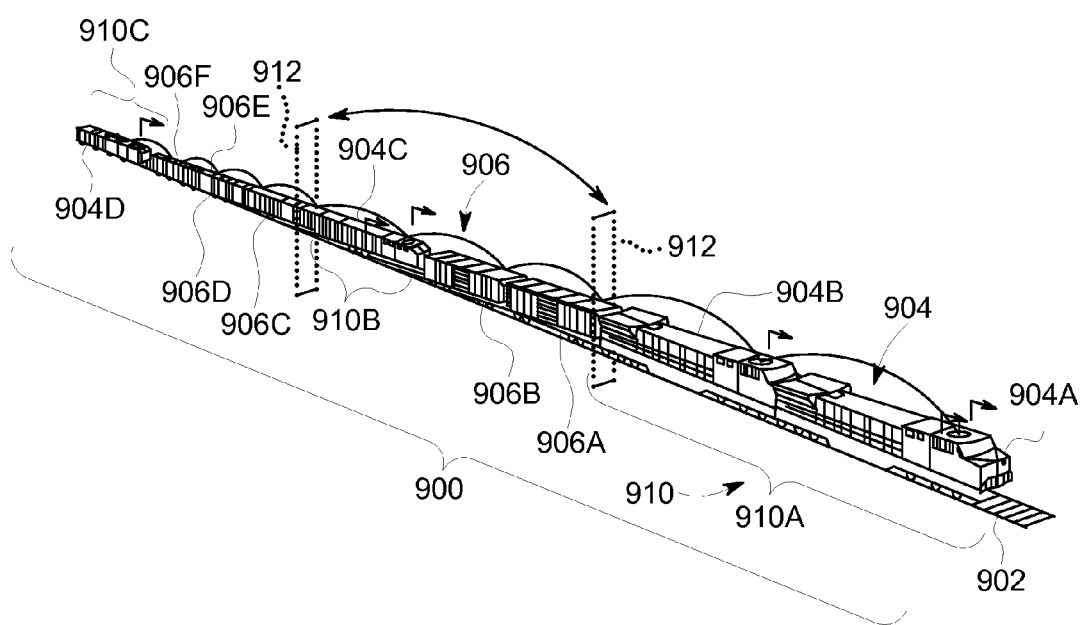
FIG. 9 is a schematic illustration of another embodiment of a vehicle system.

FIG. 9 is a schematic illustration of another embodiment of a vehicle system 900. The vehicle system 900 includes several vehicles 904, 906 that are mechanically connected with each other to travel along a route 902. The vehicles 904 (e.g., the vehicles 904A-D) represent propulsion-generating vehicles, such as vehicles that generate tractive effort or power in order to propel the vehicle system along the route 902. In an embodiment, the propulsion-generating vehicles can represent rail vehicles such as locomotives, but alternatively can represent another type of vehicle. The vehicles 906 (e.g., the vehicles 906A-F) represent non-propulsion generating vehicles, such as vehicles that do not generate tractive effort or power. In an embodiment, the non-propulsion generating vehicles can represent rail cars or another type of vehicle. The route can be a body, surface, or medium on which the vehicle system travels, such as a track formed from one or more rails, or another type of route. The number and arrangement of the vehicles 904, 906 is provided as one example, and other numbers and/or arrangements of the propulsion-generating vehicles and/or the non-propulsion generating vehicles may be used.

The vehicle system includes several vehicle consists 910 (e.g., consists 910A-C) formed from one or more propulsion-generating vehicles. In the illustrated example, a lead consist 910A includes the propulsion-generating vehicles 904A, 904B, a middle consist 910B includes the propulsion-generating vehicle 904C, and a remote consist 910C includes the propulsion-generating vehicle 904D. Optionally, a larger or fewer number of propulsion-generating vehicles may be included in one or more of the consists and/or a larger or fewer number of consists may be included in the vehicle system. The consists may be separated from each other by one or more non-propulsion generating vehicles.

A virtual fence 912 is shown in different locations in the vehicle system in FIG. 9. In a first position, the virtual fence is between the lead consist and the middle consist. In a different, second position, the virtual fence is between the middle consist and the remote consist. The fence can move between these or other locations in the vehicle system as the vehicle system travels along the route. As the fence is moved, the propulsion-generating vehicles and/or the non-propulsion-generating vehicles can be included in different groups, with the vehicles in the same group using the same operational settings, such as the same throttle notch settings, same brake settings, or the like. For example, in a group of propulsion-generating vehicles, the propulsion-generating vehicles may use the same throttle notch settings. In a group of non-propulsion-generating vehicles and/or propulsion-generating vehicles, the same brake settings may be used.

The fence can move between the positions of consists, and not the positions of the propulsion-generating vehicles within a consist, and the propulsion-generating vehicles on opposite sides of the fence can operate using different control signals. When the fence moves from time to time, the configuration of the groups changes, which can result in the change of the tractive effort generated along the length of the vehicle system, as well as the forces within the vehicle system.

While only a single fence is shown in FIG. 9, alternatively, the vehicle system may operate using plural different fences. The description herein should not be construed to be limited to using only a single fence. Plural different fences may be used. Optionally, the vehicle system may operate using different numbers of fences at different times and/or locations along the route. For example, during a first time period and/or during movement over a first segment of the route, the vehicle system may operate using a single fence, during a different, second time period and/or during movement over a different, second segment of the route, the vehicle system may operate using two or more fences. Alternatively, the vehicle system may not use any virtual fences, but instead may operate by associating the propulsion-generating vehicles with different groups at different times and/or locations along the route.

For example, when the fence is located at a lead-middle position (e.g., between the lead consist and the middle consist), the middle and remote consists are grouped together and operate using the same control signals. The propulsion-generating vehicles 904C, 904D may then use the same throttle notch settings as each other, while the propulsion-generating vehicles 904A, 904B can use the same throttle notch settings as each other. But, the throttle notch settings of the propulsion-generating vehicles 904C, 904D may be different from the throttle notch settings of the propulsion-generating vehicles 904A, 904B. When the fence is located at a middle-remote position (e.g., between the middle consist and the remote consist), the lead and middle consists are grouped together and operate at the same control signals. As a result, the propulsion-generating vehicles 904A-C can then use the same throttle notch settings as each other, while the propulsion-generating vehicle 904D can use the same or a different throttle notch setting.

A trip plan for the vehicle system can be created to designate operational settings of the propulsion-generating vehicles as a function of time and/or distance along the route. For example, the trip plan can designate speeds of the vehicle system as a function of one or more of time and/or distance along the route. This trip plan may include or be associated with command profiles that designate operational settings of the propulsion-generating vehicles. For example, the command profiles can dictate the throttle notch positions or other settings of the propulsion-generating vehicles as a function of time and/or distance along the route. The trip plan may include or be associated with change indices that dictate locations of the vehicle system along the route and/or times at which the groups in which the propulsion-generating vehicles are included changes. Optionally, the trip plan may include or be associated with change indices that dictate positions of the fence in the vehicle system at different locations along the route and/or times at which the position of the fence is to change.

The command profiles and/or change indices may be created by considering handling parameters of the vehicle system, such as in-system forces (e.g., coupler forces, or the like) or other handling parameters described above. Controlling these handling parameters (e.g., keeping the parameters within designated limits) contributes to safe running of the vehicle system and to limiting maintenance cost. For example, the larger the in-system forces are, the more likely it is that couplers between the vehicles frequently experience fatigue. The fatigue has a large impact of the life of a coupler, and the break of a coupler will cause safety concerns and increased cost of maintenance.

The command profiles and change indices may be created by modeling the vehicle system as a "rope model," which considers the vehicle system as a cascade of connected mass points, with each connection between vehicles being modeled as a rigid connection without any dynamic action of the connection. This model is based on information about the make-up of the vehicle system and the positions of the vehicles in the vehicle system, so that the model can be used to estimate the handling parameters. Optionally, another model may be used, such as a lumped mass model, a dynamic model, or another model.

By changing which vehicles are included in the different groups and/or moving the fence during the trip, the handling parameters are further addressed with the freedom to change the groupings of the vehicles. The handling parameters are expected to improve relative to not changing which vehicles are included in which groups and/or relative to not moving the fence, especially in terrain where the grade changes. For example, when the vehicle system is crossing a hill, the groups of the vehicles can change and/or the fence can be moved to dictate which vehicles use the same settings so that, after the lead consist passes the top of the hill, the lead consist can begin braking and motoring may be applied in the remote consist. After the middle consist passes the top of the hill, a braking signal can be applied to the middle consist while still providing a motoring signal to the remote consist.

Figure 10:
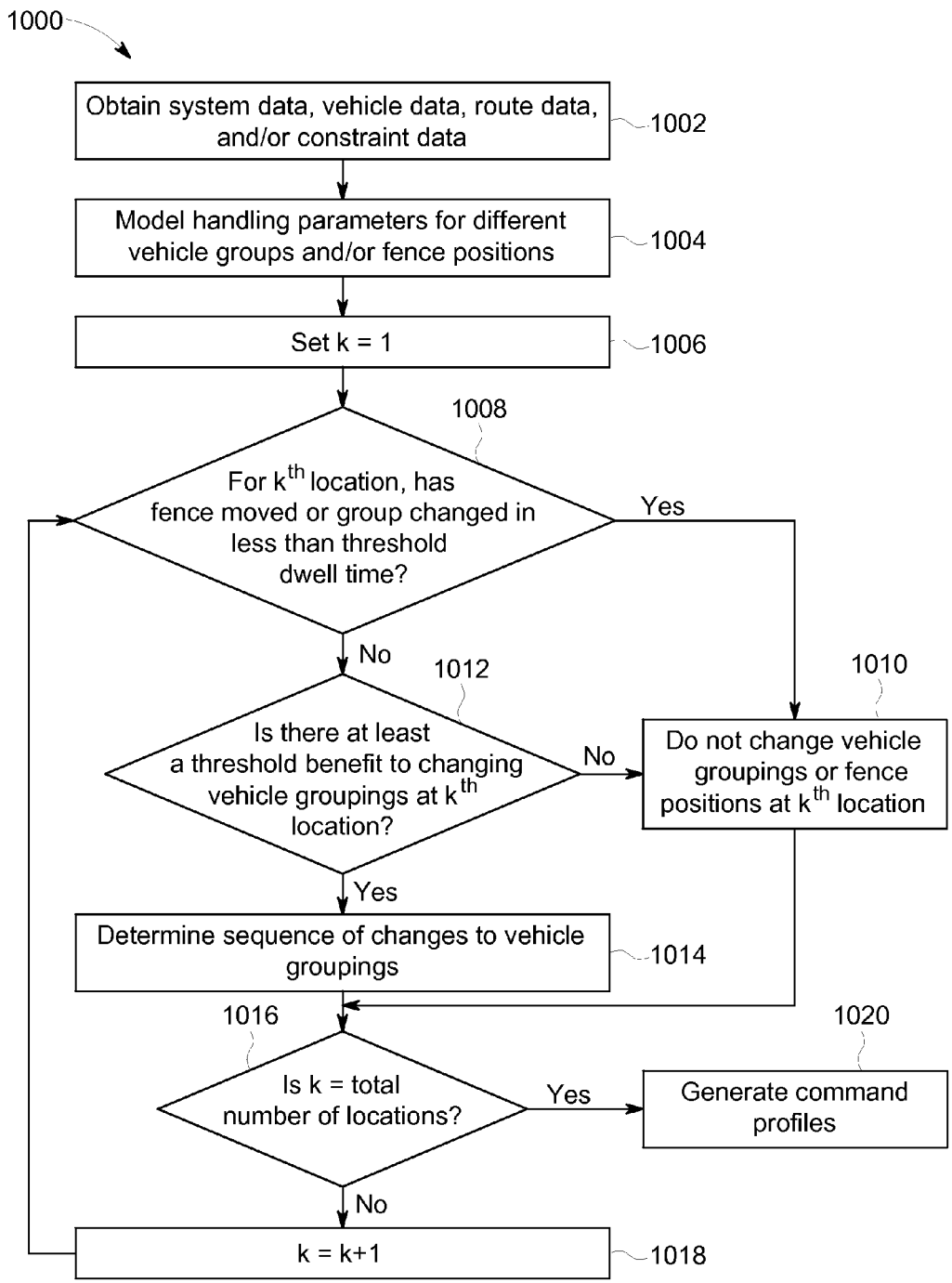
FIG. 10 illustrates a flowchart of a method for determining command profiles and/or change indices that dynamically change groupings of the vehicles and/or fence positions in the vehicle systems shown herein according to one embodiment.

FIG. 10 illustrates a flowchart of a method 1000 for determining command profiles and/or change indices that dynamically change groupings of the vehicles and/or fence positions in the vehicle systems shown herein according to one embodiment. The method 1000 can be used to generate command profiles and/or change indices for use in controlling operations of the vehicle system.

At 1002, data used to determine command profiles are obtained. This data can include system data, which represents characteristics of the vehicle system. For example, the system data can include a size of the vehicle system (e.g., length, mass, weight, etc.), a distribution of the propulsion-generating vehicles and/or non-propulsion-generating vehicles in the vehicle system (e.g., where the vehicles are located in the vehicle system), or the like. The data that is obtained may include vehicle data, which represents characteristics of the vehicles. For example, the vehicle data can include the horsepower (HP) that the vehicles can produce, the braking efforts that the vehicles can produce, and the like. The data that is obtained may include route data, such as the layout of the route that is to be traveled upon. The layout of the route can include grades, curvatures, and the like, of the route. The data that is obtained can include constraint data, such as information representative of limitations on how the vehicle system is controlled. These limitations can include restrictions on how often or frequently the groupings of the vehicles are changed, how often of frequently the fence is moved within the vehicle system, limitations on how many throttle notch positions and/or brake settings the vehicles can use, limitations on how large of a change between notch positions or settings and/or brake settings can be used, or the like. For example, the notch setting represents the tractive effort that each vehicle 104 can produce. In rail vehicles, the notch setting may extend from −8 to 8, where −8 represents maximum braking effort and 8 represent the maximum motoring effort. These notch settings may be limited to values of −8 to 8. Also, the notch command, or control sign, may not be allowed to change simultaneously. The notch command may be permitted to only change a single notch (e.g., from −8 to −7) in a designated time period (e.g., three seconds). Other data that may be obtained can include a trip plan that designates operational settings of the vehicle system as a function of time and/or distance along the route. As described herein, this trip plan can dictate speeds or other settings of the vehicle system as a function of time and/or distance.

At 1004, handling parameters are modeled for different groups of the vehicles and/or different fence positions. In one embodiment, a rope model can be used to estimate the expected forces exerted on couplers between the vehicles in the vehicle system when the vehicles are associated with different vehicle groups and/or the fence is at different positions at one or more locations along the route. The rope model can assume that the vehicle system includes mass points (which represent the vehicles) connected with connections, such as couplers, spacings between aerodynamically and/or fluidly coupled vehicles, or the like. The connection may be assumed to be rigid without dynamic movements.

The handling parameters can be determined based on at least some of the data obtained at 1002. As one example, the handling parameters can be based on a trip plan for the vehicle system. The trip plan can designate operational settings of the vehicle system as a function of time and/or distance along the route. For example, the trip plan can dictate speeds at which the vehicle system is to travel at different times and/or locations along the route. Optionally, the trip plan can dictate other settings of the vehicle system.

As one example that is not intended to limit all embodiments of the subject matter described herein, coupler forces may be calculated as the handling parameters. Alternatively, one or more other handling parameters may be calculated, estimated, sensed, or the like. in order to estimate the coupler forces as handling parameters, other threes on the connected vehicles can be examined. A vehicle may be subject to internal threes from neighboring vehicles, gravity forces, aerodynamic forces, traction forces, and the like. One of these forces includes drag on a vehicle. The total drag on a moving vehicle can be expressed by the sum of aerodynamic and mechanical forces as follows:

$$f = a + bv + cv^2 \qquad \text{(Equation \#19)}$$

where $f$ represents total drag on the vehicle, v represents the speed of the vehicle, and a, b, and c are constants determined by experiments (and usually referred to as David coefficient parameters).

Another force that may be exerted on the vehicle can include a resistance force. The resistance force can be based on the location of the vehicle along the route, and may be expressed as follows:

$$f_v = f_g + f_c \qquad \text{(Equation \#20)}$$

where $f_p$ represents the resistance force, $f_g$ represents a gravity force, and $f_c$ represents a curvature resistance force. The gravity force ($f_g$) may be expressed as follows:

$$f_g = mg \sin \theta \qquad \text{(Equation \#21)}$$

where m represents the mass of the vehicle, g represents the gravitational force, and θ represents the angle at which the vehicle is tilting or moving. The curvature resistance force ($f_c$) represents the force exerted on the vehicle by the vehicle moving along a curved section of the route. Because the layout of the route may be known, this curvature resistance force ($f_c$) may be previously measured, calculated, or estimated.

The model of the vehicle system may be is described by one or more (or all) of the following expressions:

$$m_i \dot{v}_i = u_i + f_{i-1} - f_i - f_{ai} - F_{pi}, \qquad \text{(Equation \#22)}$$
$$i = 1, 2, \ldots, n$$

$$\dot{x}_j = v_j - v_{j+1}, \qquad \text{(Equation \#23)}$$
$$j = 1, 2, \ldots n-1$$

where $m_i$ represents the mass of the $i^{th}$ vehicle in a vehicle system including n vehicles, $v_i$ represents the speed of $i^{th}$ vehicle, $f_{a_i}$ represents the aerodynamic force exerted on the $i^{th}$ vehicle, $f_{p_i}$ represents the force exerted on the $i^{th}$ vehicle due to the grade and curvature of the route where the $i^{th}$ vehicle is moving, $f_i$ represents the forces between the $i^{th}$ and $(i+1)^{th}$ vehicles, $u_i$ represents the force that the $i^{th}$ vehicle generates (e.g., which may be zero for a non-propulsion generating vehicle or the tractive effort generated by a propulsion-generating vehicle). $x_j$ represents the difference in velocities between the $j^{th}$ vehicle and the neighboring $(j+1)^{th}$ vehicle.

One objective of the model can be to reduce in-system forces, as well as the fuel consumption and/or emission generation of the vehicle system. In one embodiment, a speed profile that is generated to reduce fuel consumption and/or emission generation may be obtained, and the in-system forces on the vehicles may be modeled using the speeds designated by such a profile, in scheduling the open loop controller, it is assumed that the desired speed is reached and held. The objective of the model can be expressed as:

$$J = \sum_{i=1}^{n} f_i^2 \quad \text{(Equation \#24)}$$

where J represents a cost function representative of in-system forces of the vehicle system and $f_i$ represents the coupler force of the $i^{th}$ vehicle. Different notch settings can be examined for different locations along the route in order to calculate different values of the cost function (J), subject to the constraints described above.

The cost function (J) can be used to identify the groups of the vehicles and/or the positions of the fence within the vehicle system at different locations along the route and/or times of the trip. As used herein, the term "potential change point" refers to a location along the route and/or time during a trip of the vehicle system where the kindling parameters are determined, or the groupings of vehicles and/or fence positions may change. The potential change points of a trip may represent designated, periodic locations, such as every kilometer, every few kilometers, very few fractions of a kilometer, or other distance, along a mute. Optionally, the potential change points can represent designated, periodic times, such as every second, minute, hour, or the like. The vehicle groupings and/or fence positions may not change at every potential change point. The vehicle system may travel through several potential change points without changing the vehicle groupings or fence positions. As used herein, the phrase "potential change point along the route" may represent a geographic location or an elapsed time during a trip. In one embodiment, groupings of the vehicles and/or a position of a fence are chosen where the cost function (J) has a minimum value among all possible groupings of the vehicles and/or positions of the fence at a location along the route, or where the cost function (J) has a lower value than one or more other groupings of the vehicles and/or positions of the fence at the potential change points along the route. This can be described as a control problem that is expressed as follows:

$$\min_s J(s) = \min_s \sum_{i=1}^{n} f_i^2(s) \quad \text{(Equation \#25)}$$

$$s = 1, 2, \ldots, v$$

where s represents possible positions of the fence, which also can dictate which vehicles are in which groups. For example, the vehicles between two fences, between a fence and a leading end of the vehicle system, or the vehicles between a fence and a trailing end of the vehicle system may be included in a group. As a result, the position of the fence in the vehicle system and/or the groupings of the vehicles at different potential change points of the vehicle system along the route can be determined based on the in-system forces, as described above.

In one embodiment, the handling parameters that are calculated may be normalized and/or bunching power (e.g., horsepower) metrics may be calculated. With respect to normalizing the in-system forces (e.g., the coupler forces), these calculated forces may be normalized by multiplying or dividing the forces by a factor. In one embodiment, these forces may be normalized using the following expression:

$$J_{force}(k, i) = \frac{J_{IDP}(k, i) - \min_i(J_{IDP}(k, i))}{thresh} \quad \text{(Equation \#26)}$$

where $J_{force}(k, i)$ represents a normalized value of an in-system force (e.g., a coupler force) that is calculated as being exerted on a coupler at position of the fence that is at the $i^{th}$ vehicle at a potential change point along the route defined by the $k^{th}$ potential change point, $J_{IDP}(k, i)$ represents a combination of the calculated in-system forces, thresh represents a designated constant value, and $\min_i(J_{IDP}(k, i))$ represents a minimum value of the in-system forces calculated for all positions of the fence or all groupings of the vehicles at all potential change points. The k potential change points along the route can represent designated potential change points along the route or during the trip. These potential change points optionally can be referred to as "mesh points," Alternatively, $\min_i(J_{ODP}(k, i))$ can represent a value of the in-system forces that is less than one or more, but not all, of the in-system forces calculated for possible positions of the fence and/or all groupings of the vehicles at possible potential change points. In one aspect, $J_{IDP}(k, i)$ can represent a sum of squared coupler forces that are calculated for a position of the fence that is at the $i^{th}$ vehicle at a potential change point along the route defined by the $k^{th}$ potential change point. Optionally, $J_{IDP}(k, i)$ can represent another combination of these forces. In another embodiment, the in-system threes can be normalized in another manner, such as by dividing the calculated forces by a maximum calculated force, a minimum calculated force, a designated value, another calculated three, or the like.

Optionally, bunching power metrics can be calculated. The bunching power metrics can represent the amount of tractive effort or power that is calculated as being generated by different groups of the propulsion-generating vehicles at different positions of the fence at the different potential change points. In one embodiment, the bunching power metrics can be calculated using the following expression:

$$J_{bunch}(k, i) = \frac{HP_{bunching}(k, i)}{\max(abs(THP))} \quad \text{(Equation 9)}$$

where $J_{bunch}(k, i)$ represents the bunching power metric for the vehicle system 100 when the fence 112 is at a position at the $i^{th}$ vehicle and the vehicle system 100 is at the $k^{th}$ potential change point, $HP_{bunch}(k, i)$ represents the differential combined power output (e.g., the difference in power on opposite sides of the fence) generated by the propulsion-generating vehicles when the fence is at a position at the $i^{th}$ vehicle and the vehicle system is at the $k^{th}$ potential change point, and max(abs(THP)) represents the maximum value of the total power (e.g., horsepower) that can be generated by the propulsion-generating vehicles in the vehicle system. Optionally, max(abs(THP)) can represent another value that is not the maximum value of the total power (e.g., horsepower) that can be generated by the propulsion-generating vehicles in the vehicle system.

With the handling parameters (e.g., coupler forces) being calculated for different positions of the fence at different potential change points along the route at 1004, the method 1000 can proceed to 1006. At 1006, a value of a variable k is set to 1. This variable k can have different values to represent different potential change points along the route. For example, if the route includes 100 different potential change points (e.g., mesh points), then the variable k can change in value from one to 100. Alternatively, this variable can have other values. The method 1000 can proceed by changing the values of k to examine the calculated in-system forces and/or bunching power metrics at different potential change points along the route. As described below, the method 1000 may determine to change or move a position of the fence (or otherwise change which vehicles are in which groups) at one or more of these potential change points as the method 1000 examines the handling parameters.

At 1008, a determination is made as to whether the vehicles in one or more of the groups and/or the position of one or more fences was last changed within a designated period of time. For example, the method 1000 can examine previous potential change points and the times at which the vehicle system is expected to travel through these potential change points (e.g., using a designated speed of a previously determined trip plan or speed profile) to determine if the groupings of the vehicles and/or the position of one or more fences in the vehicle system changed in less than a threshold dwell time period ago. If the vehicle groupings and/or fence position was changed relatively recently (e.g., in less than the threshold dwell time period), then the groupings may remain the same and/or the position of the one or more fences may not be moved again to avoid changing the groupings and/or fence positions too quickly.

For example, the dwell time period may be set to one minute to ensure that the vehicle groupings and/or fence positions do not change more than once per minute. Alternatively, another dwell time period may be used. If the vehicle groupings and/or fence positions changed recently within this dwell time period, then flow of the method 1000 can proceed to 1010. On the other hand, if it has been a longer than the threshold dwell time period since the vehicle groupings and/or fence positions were last changed, then the vehicle groupings and/or fence positions may be able to be changed again. As a result, flow of the method 1000 can proceed to 1012.

At 1010, the vehicle groupings and/or fence positions are not changed when the vehicle system 1000 is at the $k^{th}$ potential change point along the route. For example, the method 1000 may have determined to change the vehicle groupings and/or fence positions too recently to safely allow for the vehicle groupings and/or fence positions to be changed again at the $k^{th}$ potential change point. Flow of the method 1000 can proceed from 1010 toward 1016, as described below.

At 1012, a determination is made as to whether there is at least a threshold benefit to changing the vehicle groupings (e.g., by moving the fence positions) when the vehicle system is at the $k^{th}$ potential change point along the route. The handling parameters that are calculated, estimated, or sensed can be examined in order to determine if changing the vehicle groupings at the $k^{th}$ potential change point results in an improvement in the vehicle handling parameters that is at least as large as the threshold benefit (where the threshold benefit represents a magnitude of the handling parameters). As one example, the coupler forces that are estimated as the handling parameters if the position of the fence is moved at the $k^{th}$ potential change point and the coupler forces that are estimated as occurring during an upcoming period of time in the trip (e.g., twice the time of the threshold dwell period of time or another time period) are examined.

If changing the vehicle groupings at the $k^{th}$ potential change point results in the handling parameters improving over this upcoming period of time by at least the amount of the threshold benefit, then changing the vehicle groupings at the $k^{th}$ potential change point may be desirable. For example, if changing the vehicle groupings results in a calculation of the coupling forces decreasing by at least a designated, non-zero threshold amount, then changing the vehicle groupings occurs. Optionally, the handling parameters may be examined to determine if changing the vehicle groupings results in a calculated increase of the handling parameters by at least a threshold benefit amount. As a result, flow of the method 1000 can proceed to 1012.

On the other hand, if changing the vehicle groupings at the $k^{th}$ potential change point does not result in the handling parameters improving over the upcoming period of time by at least the amount of the threshold benefit, then changing the vehicle groupings at the $k^{th}$ potential change point may not be desirable. For example, the reduction in the coupler forces may be sufficiently small that keeping the current position of the fence may be desired over moving the fence. As a result, flow of the method 1000 can proceed to 1010. At 1010, the vehicle groupings at the $k^{th}$ potential change point may remain the same. For example, the fence can remain at the same position as the $(k-1)^{th}$ potential change point (or may not move if the value of k is one).

At 1014, a sequence of changes in the vehicle groupings is determined for when the vehicle system is at the $k^{th}$ potential change point. For example, a sequence of movements of the position of the fence can be determined for when the vehicle system is at the $k^{th}$ potential change point. The method 1000 can determine this order at 1014.

A sequence of changes in the vehicle groupings can be represented as different groups of the vehicles at different potential change points of the vehicle system along the route. For example, a sequence may include a first grouping of the vehicles (e.g., the vehicles 904A, 904B in a first group and the vehicles 904C, 904D in a second group) when the vehicle system is at a first potential change point along the route; followed by a different, second grouping of the vehicles (e.g., the vehicle 904A in the first group, the vehicles 904B, 904C in the second group, and the vehicle 904D in a third group) when the vehicle system is at a different, second potential change point along the route; followed by a different, third grouping of the vehicles (e.g., the vehicles 904A, 904B, 904C in the first group and the vehicle 904D in the second group) when the vehicle system is at a different, third potential change point along the route; and so on.

Optionally, the sequence of changes in the vehicle groupings can be represented by a sequence of changes in fence positions. With respect to the preceding example, such a sequence may include a first fence between the vehicle 904B and the vehicle 904C when the vehicle system is at the first potential change point along the route; the first fence between the vehicle 904A and the vehicle 904B, and a second fence between the vehicle 904C and the vehicle 904D when the vehicle system is at the second potential change point along the route.

In one embodiment, the method 1000 can employ an "exhaustive search" technique to identify the sequence of changes to the vehicle groupings. This technique can involve estimating the vehicle handling parameters (e.g., coupler forces or other parameters) for all different permutations of the possible sequences of changes in the vehicle groupings (e.g., changes in the positions of the fence) during an upcoming designated period of time (e.g., twice the threshold dwell time period or another time period). The sequence of changes in the vehicle groupings that results in estimated handling parameters improving (e.g., decreasing or increasing, as appropriate) by the most or more than one or more other sequences may be identified as a selected sequence. For example, the sequence of changes in the fence positions that results in the estimated coupler forces being less than all other sequences or that are less than at least a designated number of other sequences may be identified as the selected sequence.

In another embodiment, the method 1000 can employ a "dynamic programming" technique to identify the selected sequence of changes to the vehicle groupings. This technique can involve estimating the handling parameters for many, but less than all, different permutations of the possible sequences of changes in the groupings of the vehicles during the upcoming designated period of time. In contrast to the "exhaustive search" technique, the "dynamic programming" technique may not examine certain designated sequences of changes in the vehicle groupings. The "dynamic programming" technique may exclude certain sequences of changes from consideration that are previously identified as undesirable or non-optimal sequences of changes. These sequences may be identified by an operator of a system that performs the method 1000, may be identified by previous generations of command profiles for the vehicle system, or may be identified in another manner. Among the sequences that are examined in the "dynamic programming" technique, the sequence of changes in the vehicle groupings that results in estimated handling parameters that are less or larger than other sequences (as appropriate) or that are less than or greater than (as appropriate) at least a designated number of other sequences may be identified as the selected sequence.

In another embodiment, the method 1000 can employ a "complete trip dynamic programming" technique to identify the selected sequence of changes to the vehicle groupings. This technique can involve estimating the handling parameters for many, but less than all, different permutations of the possible sequences of changes in the vehicle groupings during a period of time that is longer than the upcoming designated period of time. For example, this technique can apply the "dynamic programming" technique described above to the entire trip of the vehicle system or to another period of time that is longer than the upcoming designated period of time.

In another embodiment, the method 1000 can employ a "hybrid" technique to identify the selected sequence of changes to the vehicle groupings. This technique can involve examining the handling parameters for different vehicle groupings (e.g., at different fence positions) at different potential change points along the route and selecting the sequence that reduces or minimizes (or increases or maximizes, as appropriate) the handling parameters over a designated period of time (e.g., the threshold dwell time period) following a change in the vehicle groupings.

With continued reference to the method 1000 shown in FIG. 10, FIG. 11 illustrates a table 1100 demonstrating possible sequences of changing the vehicle groupings in the vehicle system according to one embodiment. The handling parameters estimated from changing the vehicle groupings according to the different sequences may be used to determine the selected sequence. The table 1100 includes several potential change point columns 1102 representative of different upcoming potential change points along the route. The table 1100 also includes several sequence rows 1104 representative of different sequences of changing the vehicle groupings in the vehicle system. In each of the sequence rows 1104, one or more "X" symbols are shown. The location of the X symbols indicates the potential change point or potential change points in the corresponding sequence at which the vehicle groupings are changed in that sequence when the vehicle system arrives at or passes through the potential change points. For example, the first sequence can include changing the position of the fence at the $k^{th}$ and $(k+4)^{th}$ potential change points, the fifth sequence can include changing the position of the fence at the $(k+1)^{th}$ and $(k+5)^{th}$ potential change points, and so on.

Several movement ban boxes 1106 are overlaid on the table 1100. These boxes 1106 represent the time periods over which the vehicle groupings are not allowed to change following a previous change in the vehicle groupings. For example, these boxes 1106 can correspond to the dwell time period over which the fence positions do not change following a preceding change in the fence positions. With respect to the third sequence, the box 1106 begins at the $k^{th}$ potential change point along the route (the potential change point of the vehicle system along the route where the vehicle groupings are changed, such as by changing the position of the fence) and extends to the $(k+3)^{th}$ potential change point along the route to indicate that the vehicle groupings cannot be moved again until at least the $(k+4)^{th}$ potential change point along the route. Other sequences include similar boxes 1106. With respect to the boxes 1106 in the latter potential change points, the length of the boxes 1106 is reduced in FIG. 11 due to size constraints of the table 1100. But, these boxes 1106 would extend to additional potential change points not shown in the table 1100.

The "hybrid" technique of identifying the selected sequence of changes to the vehicle groupings (e.g., sequence of movements of the fence) can determine which of the sequences improves the handling parameters (e.g., by reducing, the in-train forces) while optionally penalizing changes in the vehicle groupings and/or penalizing bunching horsepower in the vehicle system. In one embodiment, the estimated handling parameters for a sequence of changes to the vehicle groupings may be expressed as follows:

$$J = J1 + \frac{J2}{A} + J3*movePenalty + J4*bunchPenalty \qquad \text{(Eqn. 10)}$$

where J represents the estimated handling, parameters for a sequence (e.g., the coupler forces or other parameters), J1 represents a maximum value of $J_{force}(k, i)$ calculated for the different potential change points of the vehicle system along the route and different groupings of the vehicles (e.g., different fence positions, as described above), J2 represents a mean value of the values of $J_{force}(k, i)$ calculated for the different potential change points and different groupings of the vehicles (e.g., different fence positions), J3 represents a sum of the absolute values of changes in positions of the fence (e.g. which correspond or are determined from the changes in groupings of the vehicles), and J4 represents the maximum of the absolute values of $J_{bunch}(k, i)$ for the vehicle system before and after each change in vehicle groupings. Optionally, J1 may represent a value of $J_{force}(k, i)$ that is larger than one or more other values of $J_{force}(k, i)$, but not necessarily the maximum value. Alternatively, J2 can represent a median or other value of $J_{force}(k, i)$ calculated for the different potential change points along the route and different vehicle groupings. With respect to J3, this variable can be calculated by determining how far (e.g., in terms of number of potential change points, number of vehicles, distance along the length of the vehicle system, or otherwise) that one or more fences are moved between changes in the vehicle groupings. For example, if a change in vehicle groupings would correspond to moving a fence by as designated distance, then this designated distance can be used to calculate J3. J3 can represent as combination of how far the fence is being moved within a sequence being examined. Optionally, J4 can represent a value of $J_{bunch}(k, i)$ for the vehicle system before and after each change in the vehicle groupings that is larger than one or more other values of $J_{bunch}(k, i)$, but that is not necessarily the largest value. The movePenalty and bunchPenalty variables may have designated values that are based on how large the values of $J_{force}(k, i)$ are for a sequence. For example, for larger values of $J_{force}(k, i)$, such as normalized values that exceed one, the value of the movePenalty and/or bunchPenalty decreases (such as to one or zero). For smaller values of $J_{force}(k, i)$, such as normalized values that are one or less, movePenalty and/or bunchPenalty may have increased greater than one.

The value of J can be calculated for each sequence, or at least plural different sequences. The values of J can be compared to determine which sequence yields a value of J that is less than all other sequences, or that is less than one or more other sequences, but not necessarily all sequences. The sequence having the lower or lowest value of J can be identified as the selected sequence. If the values of J for the sequences are less than one, then the vehicle groupings and/or the fence positions may not be changed for the $k^{th}$ potential change point along the route.

The selected sequence may then be used to determine when and/or where along the route to change the vehicle groupings. For example, if the eighth sequence in the table 1100 is identified as the selected sequence, then the vehicle groupings or position of the fence may change when the vehicle system reaches the $(k+2)^{th}$ potential change point and again when the vehicle system reaches the $(k+6)^{th}$ potential change point (as indicated by the "X's" in the table 1100).

Returning to the description of the flowchart of the method 1000 shown in FIG. 10, at 1016, a determination is made as to whether the current value of k is equal to the total number of potential change points in the trip. For example, a determination may be made as to whether a sequence for changing vehicle groupings or fence positions has been selected for all of the designated potential change points (or at least a designated amount of the designated potential change points) along the route. If a sequence has been selected for the designated potential change points, then flow of the method 1000 can proceed to 1020. Otherwise, additional potential change points along the route may need to be examined to determine whether to change vehicle groupings and/or fence positions, and/or to determine the sequence to use in changing the vehicle groupings and/or fence positions. As a result, flow of the method 1000 can proceed toward 1018.

At 1018, the value of k is increased by one. For example, the value of k may be changed and flow of the method 1000 can return to 1008 so that the determination of whether to change vehicle groupings and/or fence positions, and/or the identification of the sequence in which to change the vehicle groupings and/or fence positions can be performed for another potential change point along the route.

At 1020, command profiles and/or change indices are generated using the selected sequences. The command profiles can include operational settings for inclusion in and/or use with a trip plan. The operational settings can indicate which throttle notch positions are to be used for which propulsion-generating vehicles and/or groups of the propulsion-generating vehicles at various potential change points along the route, the brake settings of the vehicles 904 and/or 906, the speeds of the vehicles 904 and/or 906, or the like.

The change indices can include position indices and/or time indices. The position indices can indicate the potential change points along the route at which the operational settings are to be used. The operational settings may be designated so that one or more groups of the vehicles have the same operational settings at the same potential change points. As a result, the operational settings and the corresponding potential change points designated by the command profile can arrange the vehicles into groups and/or establish virtual fences between different groups of the vehicles, as described above.

The time indices can indicate the times during travel of the vehicle system along the route at which the corresponding operational settings are to be used. The operational settings may be designated so that one or more groups of the vehicles have the same operational settings at the same times. As a result, the operational settings and the corresponding times designated by the command profile can arrange the vehicles into groups and/or establish virtual fences between different groups of the vehicles, as described above. In one aspect, the position indices may be used in place of the time indices, or the time indices may be used in place of the position indices. Alternatively, both the position indices and the time indices may be used.

The command profiles, position indices, time indices, and/or trip plan can then be communicated to the vehicle system in order to direct an onboard operator how to control the propulsion-generating vehicles, to automatically control the propulsion-generating vehicles, or the like. The vehicle system may then travel on the route for the trip using the operational settings, position indices, and/or time indices to change vehicle groupings and/or fence positions during the trip.

Figure 12:
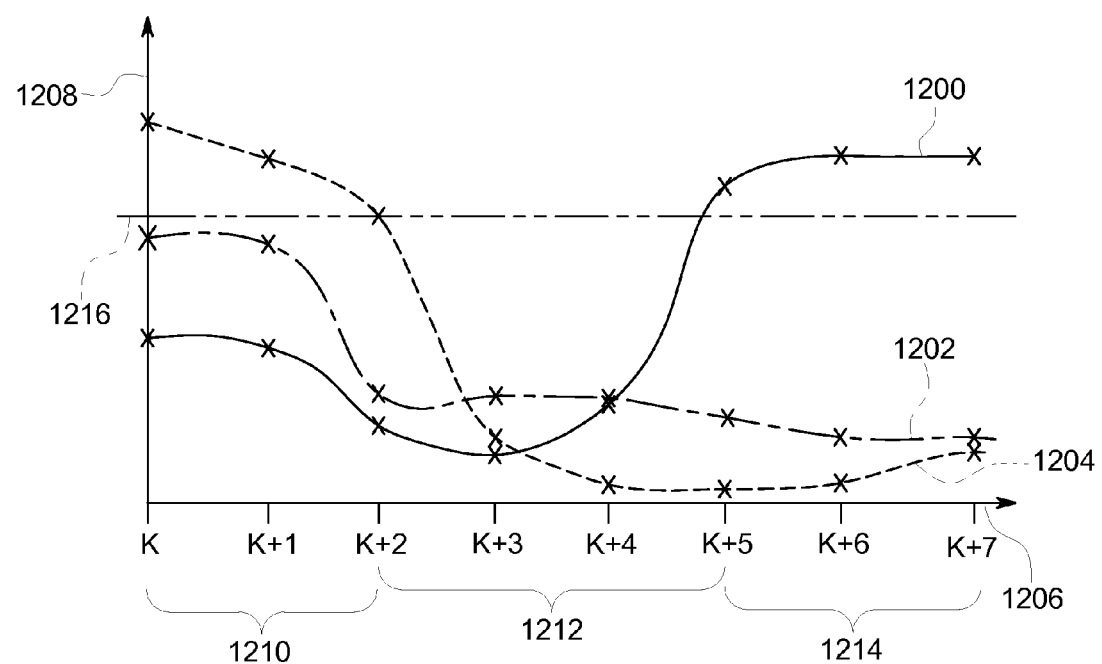
FIG. 12 illustrates examples of handling parameters calculated for three different vehicle groupings or fence positions according to one embodiment.

In another embodiment, the selected sequences may be determined by grouping different potential change points along the route having the same vehicle groupings and/or fence positions together. With continued reference to the flowchart of the method 1000 shown in FIG. 10, FIG. 12 illustrates examples of handling parameters (e.g., $J_{force}(k, i)$) calculated for three different vehicle groupings or fence positions according to one embodiment. The values of the handling parameters are represented by parameter curves 1200, 1202, 1204 that are shown alongside a horizontal axis 1206 and a vertical axis 1208. The horizontal axis 1206 represents different potential change points along the route and the vertical axis 1208 represents different values of the handling parameter. The parameter curve 1200 represents values of the handling parameter with a first vehicle grouping or first fence position (e.g., where the fence is located between the consist 910A and the consist 910B). The parameter curve 1202 represents values of the handling parameter with a different, second vehicle grouping or a different, second fence position (e.g., where the fence is located between the consist 910B and the consist 910C). The parameter curve 1204 represents values of the handling parameter with a different, third vehicle grouping or a third position of the fence (e.g., the fence located behind the consist 910C or between the consist 910C and the trailing end of the vehicle system). "X" symbols are shown along the parameter curves 1200, 1202, 1204 to represent the calculated values of the handling parameters at the different potential change points along the route for the different vehicle groupings and/or fence positions.

With the values of the handling parameter calculated for the different vehicle groupings and/or fence positions at the different potential change points along the route, a determination is made as to whether segments of potential change points along the route having the same vehicle groupings or fence positions exist, or if segments of potential change points along the route having values of the handling parameters (e.g., normalized values) that are less than a designated threshold value 1216 (e.g., one or another value) exist.

In the illustrated example, first, second, and third segments 1210, 1212, 1214 are identified based on the values of the handling parameters. The first segment 1210 can be identified based on the values of handling parameters in the third parameter curve 1204 exceeding the threshold value 1216 across consecutive potential change points along the route (e.g., potential change points k, (k+1), and (k+2)). The third segment 1214 can be identified based on the values of the handling parameters in the first parameter curve 1200 exceeding the threshold value 1216 across consecutive potential change points along the route (e.g., potential change points (k+5), (k+6), (k+7)). The second segment 1212 can be identified based on the values of the handling parameters being less than the threshold value 1216 in consecutive potential change points (e.g., mesh points (k+3), (k+4)).

In one embodiment, the identified segments 1210, 1212, 1214 are examined to determine if the segments 1210, 1212, 1214 are sufficiently long. For example, the number of consecutive potential change points in a segment may be compared to a threshold of consecutive potential change points, such as three or another value. If the number of consecutive potential change points in a segment does not meet or exceed this threshold value, then the segment may be merged into another, neighboring segment. If the number of consecutive potential change points in a segment does meet or exceed the threshold value, then the segment may be used to create the selected sequence of changes to the vehicle groupings and/or changes to the fence positions. This comparison to a threshold value can be used to ensure that the vehicle groupings and/or fence positions are not changed too frequently.

With respect to the potential change points along the route at which the values of the handing parameters do not exceed the threshold value 1216 and/or the consecutive potential change points that are insufficiently long to define a separate segment (as described above), these potential change points may be merged into one or more neighboring segments. The segment of these potential change points may be referred to as a "To Be Determined" or "TBD" segment. In the example shown in FIG. 12, the segment 1212 may be a TBD segment because the values of the handling parameters are less than the threshold value 1216 and/or because the number of potential change points along the route in the segment 1212 does not meet or exceed the threshold of consecutive potential change points.

In order to determine which neighboring segment 1210, 1214 of the TBD segment 1212 to merge the TBD segment 1212 into, a determination is made as to whether the neighboring segments 1210, 1214 on opposite sides of the TBD segment 1212 are associated with the same vehicle groupings and/or fence positions. In the illustrated example, the segment 1210 is associated with the propulsion-generating vehicles 904A, 904B, 904C, 904D being in the same group (e.g., or the third position of the fence, which is behind the trailing consist 910C) while the segment 1214 is associated with the propulsion-generating vehicles 904A, 904B being in one group and the propulsion-generating vehicles 904C, 904D being in another group (e.g., or the first position of the fence, which is between the leading consist 910A and the middle consist 910B). Therefore, the neighboring segments 1210, 1214 of the TBD segment 1212 have different vehicle groupings and/or fence positions. As a result, the TBD segment 1212 is not merged into the segment 1210 or the segment 1214. If, on the other hand, the segments 1210, 1214 were associated with the same vehicle groupings and/or fence positions as the TBD segment 1212, then the TBD segment 1212 could be merged into the segment 1210 and/or the segment 1214 to produce a larger segment comprised of the segments 1210, 1212, and/or 1214.

If the neighboring segments of a TBD segment are not associated with the same vehicle groupings or fence positions (as is the case in the example shown in FIG. 12), then a determination is made as to whether several TBD segments have been identified. If several TBD segments have been identified, then the TBD segments can be sorted in an order, such as longest to shortest in length (in terms of consecutive potential change points in the various TBD segments, distance along the route encompassed by the consecutive potential change points, or the like). The TBD segments can then be examined for merging into other segments in order from the longer TBD segments to the shorter TBD segments. Alternatively, the TBD segments may be examined in another order.

For a TBD segment being examined for merger into a neighboring segment, the number of consecutive potential change points in the segments that neighbor the TBD segment is examined. For example, if one of these neighboring segments has a number of consecutive potential change points that is less than the threshold number of potential change points, but that would have a number of consecutive potential change points that is at least as large as this threshold number, then the TBD segment is merged into this neighboring segment. For example, if the threshold number of potential change points is three and the segment 1214 only had two potential change points (instead of the three potential change points shown in FIG. 12), then the TBD segment 1212 could be merged into the segment 1214 so that the merged segment would include five consecutive potential change points. Otherwise, the TBD segment is left without merging the TBD segment into any neighboring segment.

The remaining segments, which may include segments having values of the handling parameters that exceed the threshold value 1216, merged segments, and TBD segments that are not merged with other segments, are then used to create the selected sequence of changes to the vehicle groupings and/or fence positions. At the potential change points of the trip that are included in the segments having values of the handling parameters that exceed the threshold value 1216, the vehicle groupings and/or fence positions at those potential change points along the route can be the vehicle grouping and/or fence positions associated with the values of the handling parameters that exceed the threshold value 1216.

For example, the vehicle groupings and fence positions at the potential change points k, (k+1), and (k+2) in the first segment 1210 includes the vehicles 904A, 904B, 904C, and 904D in the same group (e.g., with the fence 912 in the third position between the trailing consist 910C and the trailing end of the vehicle system) due to the values of the handling parameters in the parameter curve 1204 being relatively large. The vehicle groupings and fence position at the potential change points (k+3) and (k+4) in the TBD segment 1212 can remain at the same as the potential change points k, (k+1), and (k+2) from the first segment due to the TBD segment 1212 remaining separate from and not merged into other neighboring segments. For example, as described above, when the in-system forces are relatively low (e.g., for values of $J_{force}(k, i)$ that do not exceed the threshold value 1216), the vehicle groupings and/or fence positions may remain the same and not change due to the benefit of changing the vehicle groupings and/or fence positions being relatively small. The vehicle groupings and/or fence positions may then change to the vehicles 904A, 904B being in one group and the vehicles 904C, 904D being in another group (e.g., with the fence 912 between the leading and middle consists 910A, 910B) at the (k+5) potential change point along the route. The vehicle groupings and fence position may remain the same at least through the (k+6) and (k+7) potential change points due to the values of the handing parameters in the parameter curve 1200 being relatively large (e.g., greater than the threshold). The sequence in which the vehicle groupings and/or fence positions change between these segments can define the selected sequence. The command profiles, position indices, and/or time indices of the vehicle groupings and/or fence positions can then be generated using the selected sequence, similar to as described above.

While the foregoing description focuses on changing vehicle groupings and/or fence positions within a vehicle system having a constant number and/or arrangement of vehicles 904, 906, optionally, the vehicle groupings and/or fence positions may change by adding or removing one or more vehicles. For example, a selected sequence may include adding a propulsion-generating vehicle 904 to the vehicle system (e.g., a helper locomotive) to provide additional tractive effort at a selected potential change point. The vehicle groupings and/or fence positions may change when this additional vehicle is added. As another example, a selected sequence may include removing vehicle 904 and/or 906 from the vehicle system at a selected potential change point. The vehicle groupings and/or fence positions may change when this vehicle is removed.

Figure 13:
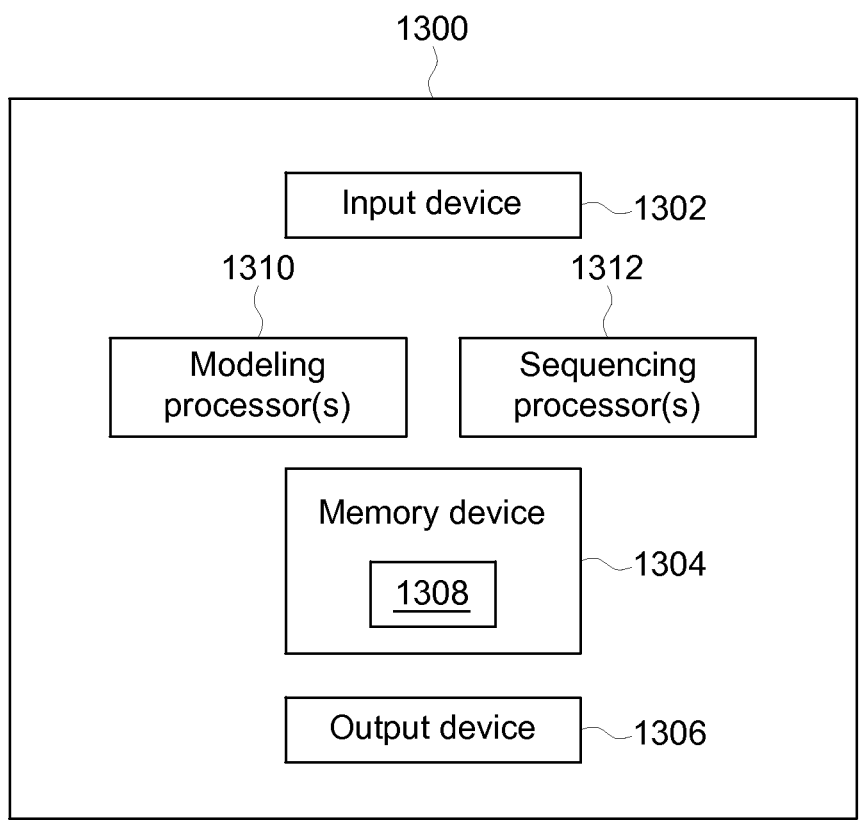
FIG. 13 illustrates a schematic diagram of a planning system according to one embodiment.

FIG. 13 illustrates a schematic diagram of a planning system 1300 according to one embodiment. The planning system can be used to generate command profiles, position indices, and/or time indices for operation of the vehicle systems described herein. For example, the planning system may perform one or more operations of the methods described herein in order to determine operational settings, vehicle groupings, fence positions, potential change points along the route where the vehicle groupings and/or fence positions are to change, or the like.

Components of the planning system may include or represent hardware circuits or circuitry that include and/or are connected with one or more processors, such as one or more computer microprocessors. The operations of the methods described herein and the planning system can be sufficiently complex such that the operations cannot be mentally performed by an average human being or a person of ordinary skill in the art within a commercially reasonable time period. For example, the generation of command profiles, position indices, and/or time indices for trips of vehicle systems may take into account a large amount of factors, may rely on relatively complex computations, may involve examination of many permutations of different potential sequences, and the like, such that such a person cannot complete the command profiles, position indices, and/or time indices within a commercially reasonable time period to have the command profiles, position indices, and/or time indices ready for the frequent trips of vehicle systems. The hardware circuits and/or processors of the planning system may be used to significantly reduce the time needed to determine the command profiles, position indices, and/or time indices such that these command profiles, position indices, and/or time indices can be generated within commercially reasonable time periods.

The planning system may be located onboard a vehicle system, off-board a vehicle system (e.g., at a dispatch center or other location), or may have some components disposed onboard a vehicle system and other components disposed off-board the vehicle system. The planning system includes an input device 1302 that obtains data used to determine the command profiles, position indices, and/or time indices. The input device can include a communication device, such as a wireless transceiver and associated hardware circuitry, a modem, or the like, that receives system data, vehicle data, route data, constraint data, trip plans (e.g., speed profiles), or the like, from an off-board location. Optionally, the input device can include a keyboard, microphone, touchscreen, stylus, or the like, that can receive this data.

A memory device 1304 includes one or more computer readable storage media, such as computer hard drives, random access memory (RAM), dynamic RAM (DRAM), static RAM (SRAM), read only memory (ROM), mask ROM, programmable ROM (PROM), erasable PROM (EPROM), electrically EPROM (EEPROM), non-volatile RAM (NVRAM), flash memory, magnetic tapes, optical discs, or the like. The memory device may store the data that is obtained by the input device, trip plans (e.g., speed profiles), designated potential change points along the route (e.g., potential change points), command profiles, position indices, time indices, or the like. In one embodiment, the flowchart of the methods described herein can represent one or more sets of instructions that are stored on the memory device for directing operations of the planning system. Alternatively, the memory device may have one or more other sets of instructions 1308 stored on the memory device (e.g., software) to direct operations of the planning system as described herein.

An output device 1306 generates signals that communicate information to a vehicle system, an operator of the vehicle system, or to another location. These signals may convey the command profiles, position indices, and/or time indices determined by the planning system. For example, the output device can be the same or different communication device as the input device in order to communicate this information to another location. Optionally, the output device can include a touchscreen, display device, speaker, or the like, for communicating the command profiles, position indices, or other information. The output device can communicate the command profiles, position indices, and/or other information to the vehicle system so that the vehicle system can present the command profiles, position indices, time indices, and/or other information to an operator to direct manual control of the vehicle system and/or to direct automatic control of the vehicle system.

The planning system includes one or more modeling processors 1310 that may include and/or represent hardware circuits or circuitry that include and/or are connected with one or more processors, such as one or more computer microprocessors. The modeling processor optionally may represent one or more sets of instructions stored on a computer readable medium, such as one or more software applications. The modeling processor can perform various calculations described herein. For example, the modeling processor may determine the handling parameters (such as coupler forces), for different locations in the vehicle system, for different vehicle groupings, for different fence positions in the vehicle system, for different potential change points (e.g., mesh points) of the vehicle system along the route, and the like, as described above. The modeling processor can determine the bunching power metrics, such as the bunching HP metrics, for different vehicle groupings, different fence positions and/or different potential change points of the vehicle system, as described above.

The planning system includes one or more sequencing processors 1312 that may include and/or represent hardware circuits or circuitry that include and/or are connected with one or more processors, such as one or more computer microprocessors. In one embodiment, the one or more modeling processors and the one or more sequencing processors may be embodied in the same computer processor or two or more computer processors. The sequencing processor optionally may represent one or more sets of instructions stored on a computer readable medium, such as one or more software applications. The sequencing processor can perform various operations described herein. For example, the sequencing processor can examine the handling parameters determined by the modeling processor, determine potential sequences for changing the vehicle groupings a/dor moving the position of the fence in the vehicle system, identify a selected sequence for changing the vehicle groupings and/or moving the fence, and the like, as described above. The sequencing processor optionally may identify the segments of potential change points along the route where the vehicle groupings and/or fence positions are the same and/or merge these segments to identify the selected sequence, also as described above. The sequencing processor may use the selected sequence to generate the command profiles, position indices, and/or time indices that are output by the output device to the vehicle system. As described above, these command profiles and position indices can be used to control where and when the vehicle groupings and/or fence positions are changed within the vehicle system.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended clauses, along with the full scope of equivalents to which such clauses are entitled. In the appended clauses, the terms "including" and "in which" are used as the plain-English equivalents of the respective terms "comprising" and "wherein." Moreover, in the following clauses, the terms "first," "second," and "third," etc. are used merely as labels, and are not intended to impose numerical requirements on their objects. Further, the limitations of the following clauses are not written in means-plus-function format and are not intended to be interpreted based on 35 U.S.C. § 112(f), unless and until such clause limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter may include other examples that occur to those of ordinary skill in the art. Such other examples are intended to be within the scope of the clauses if they have structural elements that do not differ from the literal language of the clauses, or if they include equivalent structural elements with insubstantial differences from the literal languages of the clauses.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "an embodiment" or "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

As used herein, a structure, limitation, or element that is "configured to" perform a task or operation is particularly structurally formed, constructed, programmed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, programming of the structure or element to perform the corresponding task or operation in a manner that is different from an "off-the-shelf" structure or element that is not programmed to perform the task or operation, and/or denotes structural requirements of any structure, limitation, or element that is described as being "configured to" perform the task or operation.

What is claimed is:

1. A method comprising:
   determining handling parameters of a vehicle system that includes plural vehicles operably coupled with each other to travel along a route during a trip, the handling parameters determined for different distributions of the vehicles among different groups of the vehicles at different potential change points along the route;
   determining whether to change the distributions of the vehicles among the different groups at one or more of the potential change points based on the handling parameters that are determined;
   based on determining that the distributions of the vehicles among the different groups are to change, determining a selected sequence of changes to the distributions of the vehicles among the different groups at one or more of the potential change points along the route; and
   generating change indices for one or more of the trip or an upcoming segment of the trip based on the selected sequence, the change indices designating one or more of times or the one or more potential change points along the route at which the distributions of the vehicles among the different groups changes, wherein the vehicles included in a common group of the different groups have common designated operational settings while the vehicles are in the common group.

2. The method of claim 1, wherein one or more of determining the selected sequence or generating the change indices occurs during movement of the vehicle system along the route during the trip.

3. The method of claim 1, wherein one or more of determining the handling parameters, determining whether to change the distributions of the vehicles among the different groups, or determining the selected sequence is performed using model predictive control.

4. The method of claim 1, wherein the change indices designate changes in locations of one or more virtual fences between the vehicles in the vehicle system at the one or more of times or the one or more potential change points along the route.

5. The method of claim 1, wherein determining whether to change the distributions of the vehicles among the different groups includes one or more of:
 determining whether the distributions of the vehicles has been selected to change within a preceding threshold dwell time period; or
 determining whether the handling parameters are calculated to decrease by at least a threshold amount responsive to changing the distributions of the vehicles among the different groups.

6. The method of claim 1, wherein determining the selected sequence includes identifying an order of the one or more potential change points along the route at which the distributions of the vehicles among the groups changes in the vehicle system and changes to the distributions of the vehicles among the different groups at the one or more potential change points.

7. The method of claim 6, wherein the selected sequence is determined by identifying the order of the one or more potential change points and the distributions of the vehicles among the different groups that reduces the handling parameters by at least a designated threshold amount for at least a designated threshold time period following the changes to the distributions of the vehicles among the different groups.

8. The method of claim 6, wherein the selected sequence is determined by identifying segments of consecutive change points of the one or more potential change points along the route as one or more first segments, the segments of consecutive change points identified as the one or more first segments responsive to the segments of consecutive change points being one or more of:
 at least as long as a designated number of potential change points, or
 where normalized handling parameters are calculated as exceeding a designated threshold value,
 wherein the changes to the distributions of the vehicles among the different groups at the one or more potential change points in the selected sequence are based on the first segments.

9. The method of claim 8, wherein the selected sequence is determined by identifying one or more of segments of consecutive change points of the one or more potential change points as one or more second segments, the one or more segments of consecutive change points identified as the one or more second segments responsive to the one or more segments of consecutive change points being one or more of:
 shorter than the designated number of potential change points, or
 where the normalized handling parameters are equal to or less than the designated threshold value,
 wherein the one or more second segments are merged into the one or more first segments in the selected sequence.

10. The method of claim 1, wherein the handling parameters of the vehicle system represent estimated coupler forces that are determined based on at least one of a layout of the route or a trip plan that designates operational settings of one or more of the vehicles as a function of one or more of time or distance along the route.

11. The method of claim 1, wherein the changes to the distributions of the vehicles includes one or more of adding at least one vehicle to the vehicle system or removing at least one vehicle from the vehicle system.

12. A system comprising one or more processors configured to:
 determine handling parameters of a vehicle system that includes plural vehicles operably coupled with each other to travel along a route during a trip, the handling parameters determined for different distributions of the vehicles among different groups of the vehicles at different potential change points along the route;
 determine whether to change the distributions of the vehicles among the different groups at one or more of the potential change points based on the handling parameters that are determined;
 based on determining that the distributions of the vehicles among the different groups are to change, determine a selected sequence of changes to the distributions of the vehicles among the different groups at one or more of the potential change points along the route; and
 generate change indices for one or more of the trip or an upcoming segment of the trip based on the selected sequence, the change indices designating one or more of times or the one or more potential change points along the route at which the distributions of the vehicles among the different groups changes, wherein the vehicles included in a common group of the different groups have common designated operational settings while the vehicles are in the common group.

13. The system of claim 12, wherein the one or more processors are configured to one or more of determine the selected sequence or generate the change indices during movement of the vehicle system along the route during the trip.

14. The system of claim 12, wherein the change indices designate changes in locations of one or more virtual fences between the vehicles in the vehicle system at the one or more of times or the one or more potential change points along the route.

15. The system of claim 12, wherein the one or more processors are configured to determine whether to change the distributions of the vehicles among the different groups by one or more of: determining whether the distributions of the vehicles has been selected to change within a preceding threshold dwell time period; or determining whether the handling parameters are calculated to decrease by at least a threshold amount responsive to changing the distributions of the vehicles among the different groups.

16. The system of claim 12, wherein the one or more processors are configured to determine the selected sequence by identifying an order of the one or more potential change points along the route at which the distributions of the vehicles among the groups changes in the vehicle system and changes to the distributions of the vehicles among the different groups at the one or more potential change points.

17. The system of claim 16, wherein the one or more processors are configured to determine the selected sequence by identifying the order of the one or more potential change points and the distributions of the vehicles among the different groups that reduces the handling parameters by at least a designated threshold amount for at least a designated threshold time period following the changes to the distributions of the vehicles among the different groups.

18. A method comprising:
obtaining route data and vehicle data, the route data representative of one or more of grades of a route, curvatures of the route, speed limits of the route at one or more potential change points of the route that is to be traveled by a vehicle system or that is currently being traveled by the vehicle system, wherein the vehicle system includes plural vehicles coupled with each other, the vehicle data representative of one or more of tractive efforts of the vehicles, braking efforts of the vehicles, or sizes of the vehicles;
predicting handling parameters of the vehicle system at the one or more potential change points of the route based on the route data and the vehicle data; and
determining asynchronous operational settings to be implemented by the vehicles at the one or more potential change points of the route based on the handling parameters, wherein the asynchronous operational settings are determined by identifying a combination of the asynchronous operational settings at the one or more potential change points of the route that result in the handling parameters being decreased below one or more designated thresholds.

19. The method of claim 18, wherein predicting the handling parameters includes calculating one or more forces to be exerted on the vehicles, one or more forces to be exerted on couplers between the vehicles, one or more energies to be stored in the couplers, one or more relative velocities of the vehicles, one or more natural forces to be exerted on one or more segments of the vehicle system, one or more momentums of the vehicles, or one or more distances between the vehicles.

20. The method of claim 18, wherein determining the asynchronous operational settings comprises determining different distributions of the vehicles among two or more different groups at different change points of the route, wherein the vehicles in a common group of the two or more different groups operate using a common operational setting.

* * * * *

UNITED STATES PATENT AND TRADEMARK OFFICE
CERTIFICATE OF CORRECTION

PATENT NO.         : 9,002,547 B2                                    Page 1 of 2
APPLICATION NO.    : 14/319885
DATED              : April 7, 2015
INVENTOR(S)        : Mathews, Jr. et al.

It is certified that error appears in the above-identified patent and that said Letters Patent is hereby corrected as shown below:

ON THE TITLE PAGE

Item (12), under "United States Patent", in Column 1, Line 1, delete "Matthews," and insert -- Mathews, --, therefor.

Item (72), under "Inventors", in Column 1, Line 1, delete "Matthews," and insert -- Mathews, --, therefor.

IN THE SPECIFICATION

In Column 11, Line 29, in Equation (#3), delete "=$\mu_i$" and insert -- $\mu_i$ --, therefor.

In Column 19, Line 37, delete "($v_i$-$v_{i+i}$)" and insert -- ($v_i$-$v_{i+1}$) --, therefor.

In Column 25, Line 1, delete "the coupler" and insert -- the $i^{th}$ coupler --, therefor.

In Column 38, Line 9, delete "threes" and insert -- forces --, therefor.

In Column 38, Line 11, delete "threes" and insert -- forces --, therefor.

In Column 38, Line 27, in Equation (#20), delete "$f_v$=$f_g$+$f_c$" and insert -- $f_p$=$f_g$+$f_c$ --, therefor.

In Column 39, Line 1, delete "profile, in" and insert -- profile. In --, therefor.

In Column 39, Line 22, delete "kindling" and insert -- handling --, therefor.

In Column 39, Line 28, delete "mute." and insert -- route. --, therefor.

In Column 40, Line 21, delete "points,"" and insert -- points." --, therefor.

Signed and Sealed this
Twentieth Day of October, 2015

Michelle K. Lee
*Director of the United States Patent and Trademark Office*

CERTIFICATE OF CORRECTION (continued)
U.S. Pat. No. 9,002,547 B2

IN THE SPECIFICATION

In Column 40, Line 22, delete "($J_{ODP}(k, i)$)" and insert -- ($J_{IDP}(k, i)$) --, therefor.

In Column 40, Line 31, delete "threes" and insert -- forces --, therefor.

In Column 40, Line 34, delete "three," and insert -- force, --, therefor.

In Column 44, Lines 29-30, delete "reducing," and insert -- reducing --, therefor.

In Column 44, Line 40, delete "handling," and insert -- handling --, therefor.

In Column 44, Line 65, delete "by as" and insert -- by a --, therefor.

In Column 44, Line 66, delete "represent as" and insert -- represent a --, therefor.